US009596287B2

(12) United States Patent
Rybak et al.

(10) Patent No.: US 9,596,287 B2
(45) Date of Patent: Mar. 14, 2017

(54) SYSTEMS AND METHODS FOR EXTRACTION OF VEHICLE OPERATIONAL DATA AND SHARING DATA WITH AUTHORIZED COMPUTER NETWORKS

(75) Inventors: Ihor Bohdan Rybak, Mississauga (CA); Judson Murray, Moncton (CA); Matthew Pichette, Moncton (CA)

(73) Assignee: 650340 N.B LTD., Moncton, NB ( * ) Notice: Subject to any disclaimer, the term of this patent is extended or adjusted under 35 U.S.C. 154(b) by 372 days.

(21) Appl. No.: 13/984,871

(22) PCT Filed: Feb. 20, 2012

(86) PCT No.: PCT/CA2012/000160
§ 371 (c)(1),
(2), (4) Date: Oct. 22, 2013

(87) PCT Pub. No.: WO2012/109742
PCT Pub. Date: Aug. 23, 2012

(65) Prior Publication Data
US 2014/0040434 A1    Feb. 6, 2014

Related U.S. Application Data

(60) Provisional application No. 61/444,624, filed on Feb. 18, 2011.

(51) Int. Cl.
*H04L 29/08* (2006.01)
*G07C 5/00* (2006.01)
*G07C 5/08* (2006.01)

(52) U.S. Cl.
CPC .............. *H04L 67/02* (2013.01); *G07C 5/008* (2013.01); *G07C 5/085* (2013.01)

(58) Field of Classification Search
CPC ........ G07C 5/008; G07C 5/0841; G07C 5/08; G07C 5/0808; G07C 5/006; G07C 2205/02;
(Continued)

(56) References Cited

U.S. PATENT DOCUMENTS 6,636,790 B1 * 10/2003 Lightner .............. G01M 15/102
                                                       701/31.4
6,732,031 B1    5/2004 Lightner et al.
(Continued)

FOREIGN PATENT DOCUMENTS

EP    1356996 A2    10/2003

OTHER PUBLICATIONS

WIPO, International Search Report and Written Opinion, International Application No. PCT/CA2012/000160 Nov. 15, 2012.

*Primary Examiner* — Kevin Bates
*Assistant Examiner* — Ranjan Pant
(74) *Attorney, Agent, or Firm* — Norton Rose Fulbright Canada LLP

(57) ABSTRACT

Systems and methods for the generation and sharing of vehicle operation are provided. The system includes: a data harvesting device connected to a vehicle, the data harvesting device capturing vehicle information from the vehicle and processing the vehicle information to generate current vehicle operation data; and a computer system in communication with the data harvesting device, the computer system including one or more server computers. The computer system includes a database system for logging the current vehicle operation data, the database system including a profile for the vehicle configured to store the received current vehicle operation data. The computer system is configured to transmit the current vehicle operation data to one or more remote server computers. The computer system is also operable to enable the sharing of vehicle operation data and related information via social networks.

20 Claims, 13 Drawing Sheets

(58) Field of Classification Search
CPC ..... G07C 9/00571; H04L 29/06; H04L 67/12; H04L 69/329; H04L 67/02; H04L 12/1895; H04L 67/20; G08G 1/20; G08G 1/01; G08G 1/096716; G08G 1/096741; G08G 1/096725; G08G 1/052; G06Q 50/30; G01M 17/00; G06F 17/30864; G06F 17/30289; G06F 17/30477; H04W 4/04

See application file for complete search history.

(56) References Cited

U.S. PATENT DOCUMENTS

| | | | | |
|---|---|---|---|---|
| 7,818,098 | B2* | 10/2010 | Koepf | G06F 11/25 |
| | | | | 701/1 |
| 8,886,393 | B2* | 11/2014 | Edwards | G07C 5/008 |
| | | | | 340/425.5 |
| 2002/0091706 | A1* | 7/2002 | Anderson | G06Q 10/10 |
| 2004/0153356 | A1* | 8/2004 | Lockwood | G06Q 10/20 |
| | | | | 705/305 |
| 2005/0278146 | A1* | 12/2005 | Nitsche | B60L 3/0046 |
| | | | | 702/183 |
| 2008/0236141 | A1* | 10/2008 | Peng | F01N 11/00 |
| | | | | 60/273 |
| 2009/0106036 | A1* | 4/2009 | Tamura | G06Q 10/20 |
| | | | | 705/305 |
| 2011/0077817 | A1 | 3/2011 | Sun et al. | |
| 2011/0112717 | A1* | 5/2011 | Resner | G07C 5/008 |
| | | | | 701/31.4 |
| 2011/0153148 | A1* | 6/2011 | Edwards | G07C 5/008 |
| | | | | 701/29.5 |

\* cited by examiner

SYSTEMS AND METHODS FOR EXTRACTION OF VEHICLE OPERATIONAL DATA AND SHARING DATA WITH AUTHORIZED COMPUTER NETWORKS

FIELD OF THE INVENTION

The present invention relates to social networks. The present disclosure also relates generally to technologies for vehicle monitoring.

BACKGROUND

There are a number of prior art technologies that enable the collection of data regarding the operation of a vehicle ("vehicle operation data"), which may include engine performance information, data indicating an engine malfunction or the likelihood of a malfunction occurring, travel speed and distance and other information associated with the operation of the vehicle. For example, speedometers, accelerometers, GPS technologies or a combination thereof may be used.

Moreover, consumer-oriented land vehicles manufactured in the last decade, including most automobiles and light trucks, incorporate an internal automotive network of electronic computers or electronic control units ("ECUs") to regulate and optimize the performance of those vehicles, and to provide self-diagnostic information to signal the presence of faults and aid in their resolution. Access to this internal automotive network can be gained through an OBD-II diagnostic port of the vehicle. High-level OBD-II communications protocol was established as a compulsory standard for all North American vehicles manufactured since 1996.

There are a number of prior art technologies that utilize OBD-II ports to gather vehicle operation data for a number of purposes. The original purpose of OBD-II ports is to enable the gathering of vehicle operation data for diagnostic purposes, usually by a vehicle maintenance technician or vehicle mechanic. This gathering of vehicle operation data usually happens in conjunction with a service visit where a device is connected temporarily to the OBD-II port to extract the vehicle operation data. These prior art technologies are relatively affordable, but they generally do not provide information that is reliable enough to provide an accurate snapshot of "vehicle health" at any particular point in time during operation of the vehicle.

Across the world, social networks are becoming an increasingly popular medium for staying in touch with friends. As a result of this popularity, certain social networks such as FACEBOOK™ and LinkedIn™ have millions and millions of users. There is an increasing demand for technologies that enable the integration of real life interests into social networks in an easy to use and engaging manner.

Many people are interested very interested in their vehicle, and the vehicles of others. Vehicle fan clubs, and "drive and get together" events are very common. There is a need for a social media network and social media networking method that enables social interactions based on vehicle interest.

SUMMARY

In one aspect of the invention, a system for enabling the generation and sharing of vehicle operation dia via a computer network, is provided comprising:
  (a) a data harvesting device connected to an information system of a vehicle, the data harvesting device capturing vehicle information from the vehicle and processing the vehicle information to generate current vehicle operation data; and
  (b) a computer system in communication with the data harvesting device, the computer system including one or more server computers connected to a computer network;
  the data harvesting device connecting to the computer system on an intermittent basis via a wireless network;
  the computer system including a database system for logging the current vehicle operation data; and
  the computer system being configured to act as an information gateway for provisioning the current vehicle operation data to one or more remote server computers in communication with the computer system.

In a further aspect of the invention, the current vehicle operation data includes one or more of (a) current odometer information, (b) current engine performance information, (c) current fuel consumption information, and (d) current performance of vehicle sub-systems including engine emission systems, clif the inventionmate systems, or electrical systems.

In a still further aspect of the invention, the data harvesting device is configured to include or obtain information elements for identifying the vehicle to the computer system, and the data harvesting device includes these information elements in communications from the data harvesting device to the computer system including the vehicle operation data: and the computer system is responsive to the information elements to link current vehicle operation data with a profile established in the database system for the vehicle, and to log vehicle operation data to this profile.

In another aspect of the invention, the information elements include the vehicle information number for the vehicle, or the computer system is configured to retrieve the vehicle information number for the vehicle from the database system based on the information elements.

In yet another aspect of the invention, the current vehicle operation data includes current odometer information and the computer system includes or is linked to a vehicle service appointment scheduling component that is operable to: access or generate a vehicle information number for the vehicle associated with the vehicle operation data; apply one or more business rules to determine whether, based on the current odometer information, there is a current service or recall requirement for the vehicle; and generate a request for scheduling of a service or recall appointment, and send this request to one or more communication devices associated with the user.

In another aspect of the invention, the scheduling component is further operable to: retrieve the personnel and/or part requirements associated with the service or recall requirement, and initiate a lookup request for corresponding service personnel and/or part availability; send the lookup request to relevant computer systems; and receive a response to the lookup request and include availability information in the response in the request for scheduling sent to the user.

In a still further aspect of the invention, the computer system is linked to a marketing system, wherein the marking system is operable to generate and send electronic promotional material, including offers, coupons, or tokens, to the user based on the current vehicle operation data.

In another aspect of the invention, the computer system enables the sharing of the vehicle operation data and optionally other related vehicle information via one or more social media networks linked to the computer system, based on one or more preferences defined by a user associated with the vehicle.

In a further aspect, the computer system enables the user to follow the vehicle via the one or more social media networks. In another aspect, the computer system enables the user to permit one or more social media connections to follow the vehicle via one or more social media networks. In yet another aspect, the computer system enables one or more other users to follow the vehicle via one or more social media networks.

In another aspect, a computer-implemented method is provided for enabling the generation and sharing of vehicle operation data via a computer network, characterized in that the method comprises: configuring a data harvesting device to connect on an intermittent basis to an information system of a vehicle; the data harvesting device capturing vehicle information from the vehicle and processing the vehicle information to generate current vehicle operation data; the data harvesting device sending the current vehicle operation data via a wireless network to a computer system in communication with the data harvesting device, the computer system including one or more server computers connected to the computer network, being linked to or including a database system, and being configured to act as a information gateway for provisioning current vehicle operation data to one or more authorized remote computers via the computer network; the computer system logging the current vehicle operation data to the database system; and the computer system provisioning the current vehicle operation data via the computer network to the one or more authorized remote computers;

In one aspect, there is provided a computer-implemented method for extracting vehicle operation data from an internal automotive network, comprising: i) obtaining data available on the internal automotive network via iterative interrogation; ii) analyzing the obtained data to identify a set of candidate data values having at least one common feature within a suitable proximity margin; and iii) heuristically selecting a candidate data value best matching one or more selection criteria to identify a true value.

In this respect, before explaining at least one embodiment in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Figure 1:
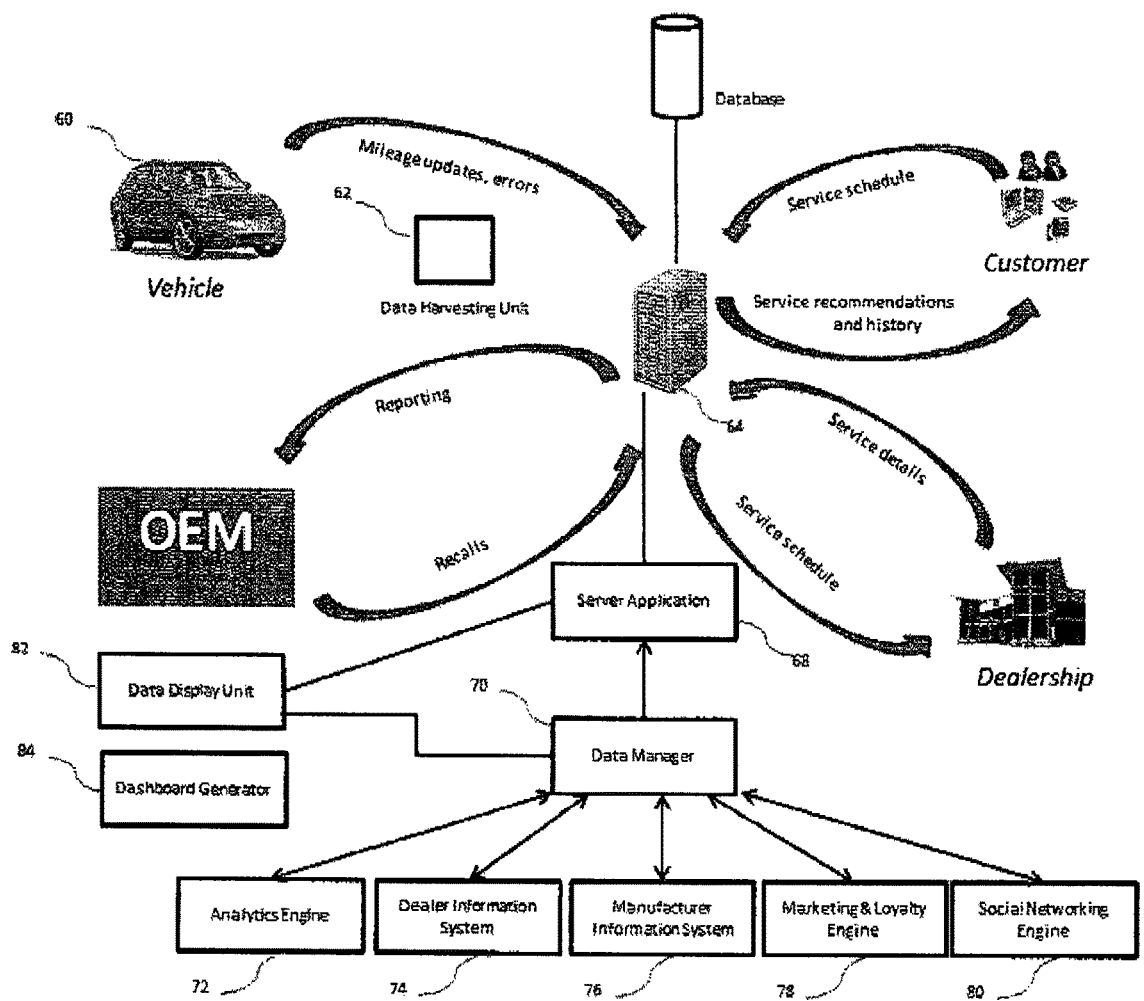
FIG. 1 is a system diagram illustrating a representative implementation of the platform of the present invention.

In the drawings, various embodiments of the present systems and methods are illustrated by way of example. It is to be expressly understood that the description and drawings are only for the purpose of illustration.

DETAILED DESCRIPTION

The term "vehicle" is used extensively in this disclosure and refers to any sort of powered mobile transportation device, including passenger vehicles as well as industrial equipment, commercial vehicles, automated equipment, robots, aerial conveyances, etc.

The present disclosure relates to a system and method for extraction of vehicle operation data in real time or near real time from an internal automotive network, and provision of this data to one or more external computer network implemented system for consumption of vehicle operation data such such systems.

Vehicle operation data may be captured using a number of different methods and/or devices. In one possible implementation, an after market data capture device may be used, for example as described under the heading "Data Capture" below. It should be understood that the present invention is not limited to the use of any particular data capture or data harvesting devices or method.

The overall computer networking implemented system of the present invention is illustrated in one particular embodiment in FIG. 1. One or more data harvesting devices 62 are each linked to or made part of a vehicle 60. The data harvesting devices 62 are linked to one or more remote servers 64. The data harvesting devices 62 are configured to capture and log vehicle operation data, and then transfer via a wireless network (when a suitable wireless network is available), the vehicle operation data to the remote server 64. The remote server 64 acts as an information gateway to one or more different computer network implemented systems or services that may consume the vehicle operation data.

The vehicle operation data may consist of for example real time or near real time odometer information, or vehicle performance data including engine performance data (based on a number of different possible performance parameters). In essence, the data harvesting devices 62 are operable to extract the same or substantially the same information that a vehicle diagnostic system is operable to extract.

One contribution of the invention is the conception that a novel and innovative information network or service may be provided by deploying the data harvesting devices 62 to a plurality of vehicles 60, providing functionality in the data harvesting devices 62 to enable (A) the extraction, and optionally the processing, of information from the vehicle's onboard systems so as to generate vehicle operation data, and (B) intermittently transfer wirelessly the vehicle operation data to the remote server 64 so as to create an information network or service for provisioning up to date vehicle operation data to a range of possible systems or devices, where these systems or devices benefit from access to up to date vehicle operation data.

The server 64 may link to a server application 68 which may also be implemented as an application repository. The server application 68 includes, or is linked to a data manager 70 that is linked to a database. The data manager 70 manages the storage and access to vehicle operation data, by one or more entities (as described below). The server 64, by operation of the data manager 70, may act as a data centre, for provisioning vehicle operation data and related information. The data manager 70 may include or link to an administrative utility that enables the configuration of various rules for accessing vehicle operation data, or reports based on vehicle operation data, or related data services.

In a further aspect of the present invention, the server 64 A number of these operations may be provided using a network architecture where the server 64 acts as an information resource for example to a dealer's dealer information system, or a manufacturer's marketing system or loyalty engine, also as shown in FIG. 1. Also, the operator of the server 64 may support these operations by deploying a variety of systems within its own environment, which are operable, for example based on a SaaS model to provide a range of data services to manufacturers, dealers and others. For example, server application 68 may include or link to an improved vehicle maintenance scheduling system.

FIG. 1 illustrates one possible implementation of the system of the present invention. The server application 68 may also include or link to:

(A) An analytics engine 72 for enabling the application of data analytics tools and processes to vehicle operation data so as to generate vehicle operation analytics data, and also generation of various reports based on this information, and also providing input to the dashboard generator 84.

(B) A dealer information system 74.

(C) A manufacturer information system 76.

(D) A loyalty engine 78 for running one or more loyalty programs relate to vehicles, and may benefit from access to vehicle operation data. Examples are provided below.

Dealer information systems 74, manufacturer information system 76, and/or the loyalty engine 78 may constitute third party systems, that access the system of the present invention for vehicle operation data. It should also be understood that the server application 68 may include or link to proprietary systems, such as a dealer information system 74 and/or a manufacturer information system 76, that include functions or features that leverage the access to vehicle operation data, including for example real time or near real time vehicle health information, that supports new, innovative, and engaging functionality.

(E) A social networking engine or platform 80. This platform supports the novel and innovative social networking environment of the present invention, which is further described below.

The server application 68 may enable functions of a data display unit 82, for example for enabling the display of requested vehicle operation data (from an authorized user by operation of the access management provided by the data manager 70) in a variety of formats consuming by a wide variety of network connected devices, display types, data display formats and so on. The data display unit 82 may for example incorporate features that enable the automatic display of vehicle operation data in a format that is optimized for a requesting device, for example by adapting the display of information to the display requirements associated for example with a particular mobile device, tablet computer, desktop computer, or onboard computer device in a vehicle.

In a further aspect of the present invention, it should be understood that the server application 68 incorporates various web presentment features. In one aspect of these, the server application 68 may include or linkn to a dashboard generator 84. The dashboard generator 84, based on user preferences for example, is operable to generate and iteratively update a dashboard that includes in part vehicle operation data described in this disclosure. This may include for example a "vehicle health dashboard" that a vehicle owner subscribed to the system of the present invention may consume from a number of different network connected devices, in a number of ways, to regularly receive updates regarding vehicle healthy, or simply be assured that his/her vehicle is operating within normal parameters. The dashboard may also include links to various information or other services (such as as a link to an information service associated with the vehicle manufacturer or the dealer) for example to obtain answers to questions raised by consumption of vehicle health information through the dashboard. It should be understood that the described dashboard (which may for example be incorporated into a browser start page for example) constitutes a novel and innovative data service that provides new and useful opportunities for engagement with a vehicle, and through this with the brand associated with the vehicle.

Vehicle Information Systems

For sake of convenience, dealer information systems, manufacturer information systems, and the loyalty engine described may be collectively referred to as "vehicle information systems" as these systems all consume vehicle information, and may benefit from access to vehicle operation data obtained by operation of the present invention.

It should also be understood that the manufacturer system 76 and the loyalty engine 78 may be implemented as a single system, for example as a single marketing platform individuals who have bought vehicles made by the manufacturer for example. It should also be understood that various different business models exist in the vehicle industry, such that in some cases manufacturer systems incorporate functions or features that may be associated with a dealer information system, or functions or features that may be associated with a manufacturer information system, may be made part of a manufacturer system.

The up to date vehicle operation data (for example current odometer readings) can be very useful to various operations that are normally embodied in a dealer information system. The dealer information system 74 may comprise any third party dealer information system ("DIS") linked to or integrated with the information service of the present invention. Alternatively, the system of the present invention may include a proprietary DIS, for example an Internet implemented DIS, implemented for example as a SaaS service. Such a DIS would enable for example generation and sending of "just in time" vehicle maintenance reminders. Significant resources are currently spent on sending vehicle maintenance reminders. Dealers need to maximize their revenue to ensure that their customers who have bought or leased vehicles from them, or through them, return to the dealership for various repair and maintenance services. Vehicle maintenance services are generally tied to mileage milestones. Prior art systems send maintenance reminders based on estimated mileage times (based for example on average distances drive by certain periods of time), however, drivers do not drive at the same rate. Studies have shown that the response rates improve if reminders are sent just before mileage milestones are met. Access to this data provides a competitive advantage to dealers over other (sometimes less expensive) businesses offering the same or similar repair/maintenance services. If reminders are not sent "just in time", there is a greater risk that the owner may turn to another provider for the required services, for example a low cost provider, or provider whose location is more convenient. The dispatch of "just in time" reminders creates a perception of greater customer care, and reinforces the existence of a "connection" between the dealer's and the owner's vehicle. This provides valuable engagement between the vehicle owner and the brand of the dealer as a sources of repair/maintenance services. Accurate odometer information is also important to manage recall efficiently and therefore profitably. Of course, it should also be understood that the vehicle operation data also may include information that enables (for example based on invoking the analytics engine 72 the prediction if certain break downs are likely to occur, and avoidance measures including preventive repairs or part replacements may be recommended. This may take the form of customized messaging such as "Your breaks appear to be performing at around 65%. If these are not repaired in the next two weeks, their performance may decrease below levels that are safe."

Further details regarding application of the present invention to novel and innovative operations of a DIS are provided below.

The server application 68 may include an analytics engine 72 which is operable to enhance the vehicle operation data using a variety of data mining and data modeling tools or techniques for example to predict maintenance requirements, identify vehicle performance trends, infer vehicle purchase trends and the like. The analytics engine may employ the vehicle operation data and other data made accessible to the server 64 such as communications and interactions by vehicle owners or between vehicle owner groups facilitated by operation of the social networking environment described below. The analytics engine 72 is operable to feed enhanced data to the other resources of the server application 68. The analytics engine 72 may be linked to a reporting utility that is operable to create a series of reports, including based on preferences of the recipient of such reports (whether for example the manufacturer or the dealer). The presentment of such reports, if made accessible via one or more web pages, can be enhanced by operation of the data display utility 82 for example including dealer or manufacturer specific branding, as appropriate, or other web presentment preferences.

Many dealers have their own dealer information system, in which case the server application 68 may be configured to intemperate with such dealer information systems for example to provide an enhanced maintenance reminder and scheduling system. Currently most dealer information systems or systems linked to these, send reminders to customers based on approximate or anticipated mileage. The dealer has an interest in ensuring that these reminders are acted on as much as possible, but the reminders are often ignored in part because there is a disconnect between the need for a scheduled maintenance which is based on actual mileage readings and the estimated mileage reading used by the dealers. In other words, the customer is most likely to book the service appointment if the reminder is just in time, and customers who are busy and overwhelmed with electronic communications as it is, are quite likely to ignore reminder that is sent too early or too late. Alternatively, repeated reminders which are common in part to address the lack of access to accurate odometer information using prior art technologies can be quite annoying to vehicle owners, which in turn can diminish the value associated with a brand. Conversely, a maintenance reminder received by a vehicle owner at the right time and once or twice will result in a better response rate and also will enhance the customer's brand experience.

The better response rate also allows the dealers to manage their maintenance related human resources better. A reminder with improved relevance, and which is more likely to be responded to, can be sent with a few proposed maintenance times, sent such that times will be left open for a predetermined amount of time. This reduces the time required by customers to book their appointments, and also reduces the costs involved in taking bookings. The customers are also provided an enhanced service. The operations described can be used to better utilize maintenance related human resources. Overall, the ability of the system to initiate transactions between the dealer or OEM and the vehicle owner based on actual operational data and then only when appropriate, and allowing that vehicle owner to take necessary or desired actions with an absolute minimum of effort or diversion through optimized workflows and man-machine interfaces, will directly engender loyalty and hence persistence in dealer-customer relationships.

In addition, incentives can be attached to filling gaps in schedules using a scheduling utility that relies on the enhanced information provided using vehicle operation data provided by operation of the present system and method.

The data manager 70 can be used to map data to integrate with the dealer's scheduling systems, whether part of their dealer information system or otherwise.

Alternatively, the server application 68 includes a dealer information system 74 that enables the dealer's personnel, using a web interface, to utilize functionality similar to dealer information systems made available through a series of web pages, and accessing improved scheduling operations for example that leverage the access to vehicle operation data.

Similarly, the data manager 70 can provide access selected data to a manufacturer's information system that is used to manage product recalls, identify product trends including based on in the field vehicle operation data. An example of data that could be routed to a manufacturer by operation of the present system is a trouble code related to a vehicle made by that manufacturer. The present system and method enables access to more granular vehicle operation data on a more timely basis, enabling the manufacturer to identify and rectify, or at least manage public response to a problem, before the problem or public reaction to it gets out of control. Prior art technology provides access to this data only based on vehicles brought into dealerships either for scheduled maintenance or for based on a problem that has already been noticed by a vehicle owner. The present system and method enables much more proactive management of performance issues, and also better management of brand experience.

Alternatively, the server application 68 includes a manufacturer information system 76 that enables the manufacturer's personnel, using a web interface, to utilize functionality similar to manufacturer information systems made available through a series of web pages, and to access improved product and market intelligence based on the vehicle operation data made available by operation of the present system and method, and leveraging other resources as well such as the analytics engine 72.

The data manager 70 may also be used to link data to other relevant data that may be accessible to the data manager. For example, the data manager 70 may have access to a historical profile for the particular vehicle owner, including for example the mileage associated with past decisions to buy a new vehicle. This information can be used to send a notification or report to a manufacturer or dealer that may trigger marketing events such as a sales call, sending an invitation to an event, or otherwise.

While integration of data made available via the server 64 with marketing or loyalty systems of manufacturers or dealers or their service providers is possible, dealers and manufacturers may also access marketing and loyalty services and offerings via the operator of the present system and method. The server application 68 includes a marketing and loyalty engine 78 which may incorporate a series of known marketing and loyalty resources that leverage the vehicle operation data made available by operation of the present system and method.

Figure 2:
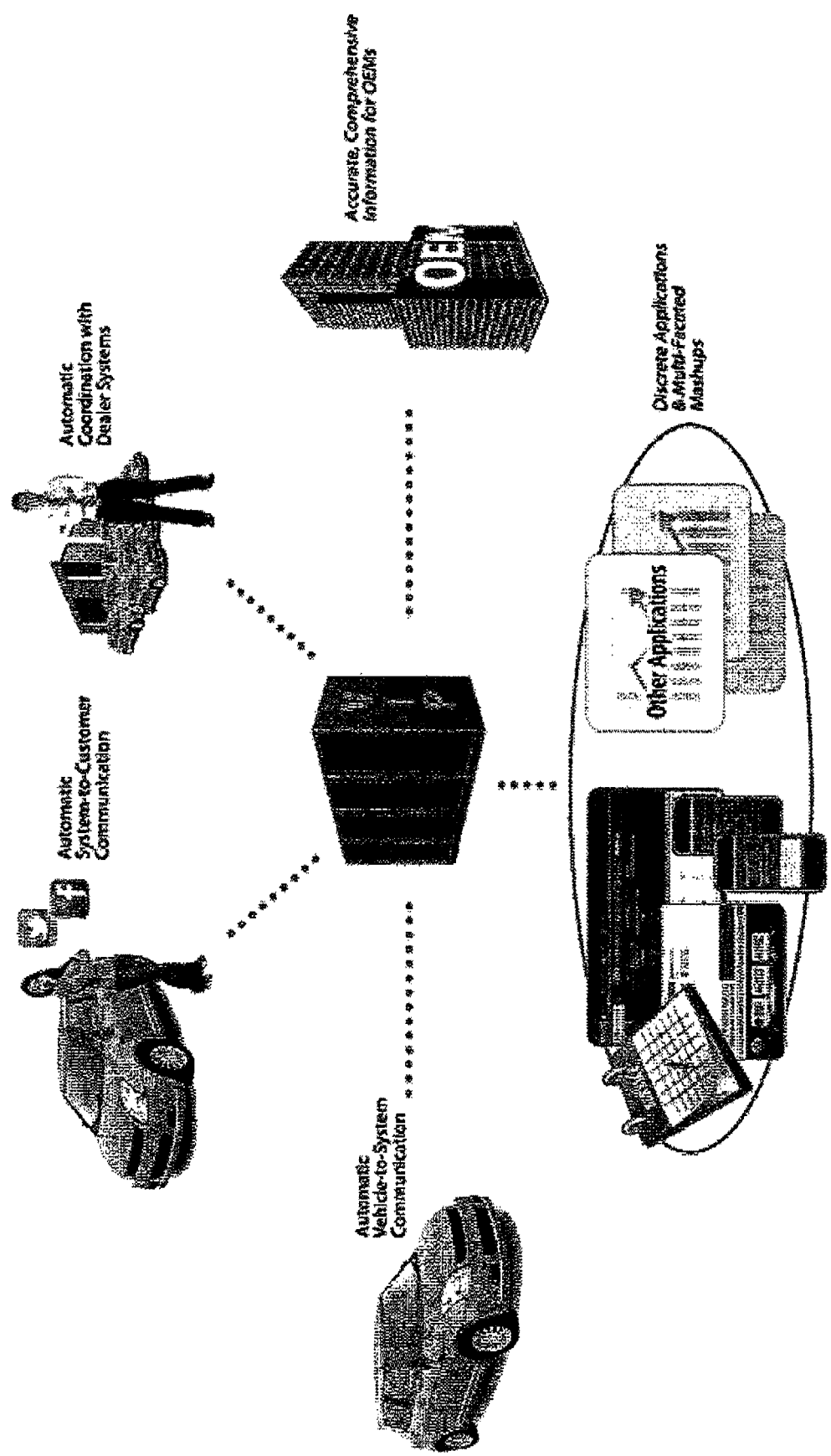
FIG. 2 is a high level server process workflow diagram, illustrating one aspect of the implementation of the present invention.
Figure 3:
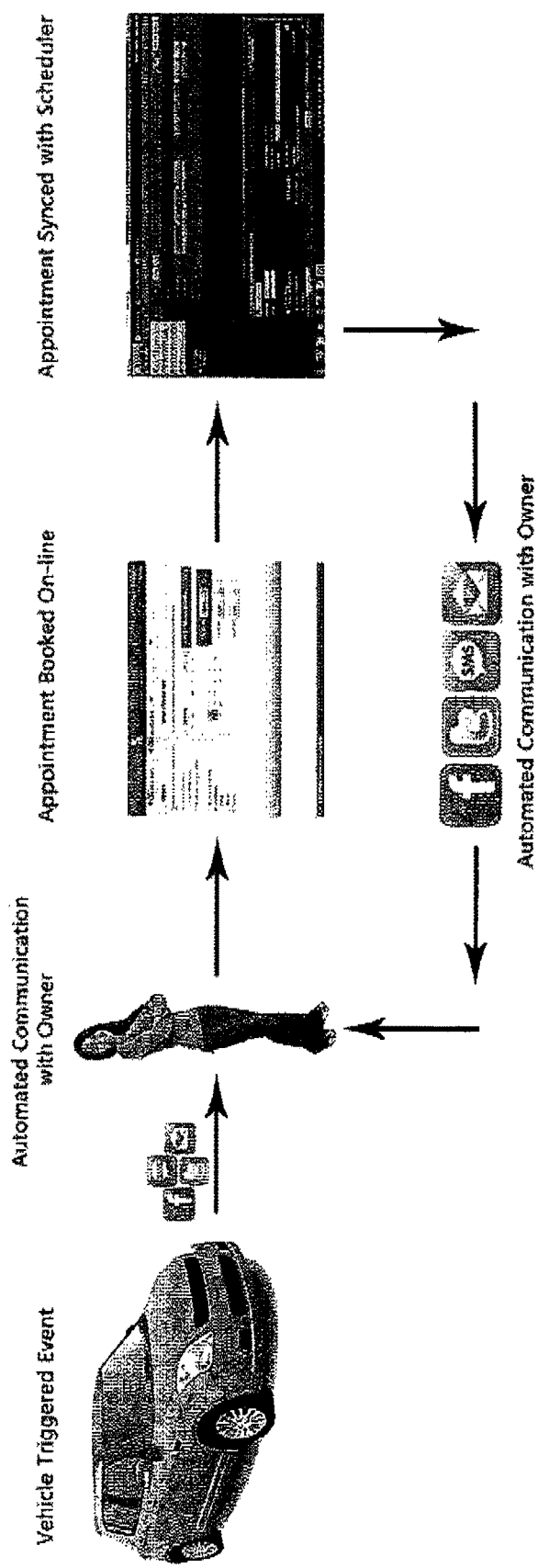
FIG. 3 illustrates a possible implementation of the present invention, in this case an high level server resource diagram, including scheduling.

As shown in FIG. 2, by operation of the system of the present invention, the vehicle (based on conditions captured by the data harvesting device 62 that meet one or more vehicle operation parameters) is in effect provided with resources for generating a system trigger based on its current vehicle health conditions for example. The data manager 70 may linked to a messaging utility that is part of the server application 68 to initiate one or more communications with the owner, such as for example a text message or email based alert. Also, the data manager 70 may provide an update to one or more social networks selected by the vehicle owner and the social networking engine 80 may use social media to notify the vehicle owner. As explained below, the present invention contemplates a proprietary social networking engine 80 for enabling vehicle related social interactions, and also social networking engine 80 may function as an interface to established third party social networking platforms.

The data manager 70 may implement various filters for the purposes of triggering or notification. For example, certain users may configure settings to establish what notifications they wish to receive or not receive, and the rules for their storage for access at a later time for example. For example, these filters may permit the application of severity levels to determine what notifications to provide to user, and the way in which these will be communicated.

The data manager 70 may also apply one or more filters for the purpose of sending triggers to other systems, depending on applicable permissions. For example, the data manager 70 may embody one or more configurations that determine the specific vehicle operation data that will trigger the scheduling of a vehicle maintenance or report appointment for example. Based on one or more scheduling profiles, the data manager 70 may provide information to a scheduling utility with information regarding the identity of the vehicle, and the specific problem that the vehicle appears to have, all in real time or near real time. The scheduling utility may be part of the dealer information system 74 or may be a separate component. In one particular embodiment of the present invention, the server application 68 incorporates the scheduling utility, which may be accessed by dealer information system as a valuable data service. It should be understood that one aspect present invention is a novel and innovative scheduling system that accesses and acts upon real time or near real time vehicle operation data. The scheduling system may access availability of required technicians for example at a particular location and may send a communication to the vehicle owner that includes (A) notification of suspected problem, (B) suggestion of parts/services for rectification (maintenance, repair, replacement of part etc.), and (C) suggestions of one or more windows for scheduling the necessary service visit.

Vehicle owners are busy and many procrastinate on scheduling service appointments, even if necessary. Also, the back and forth required to schedule service appointments is quite time consuming and resource intensive. However, the platform of the present invention is operable to generate scheduling requests with an immediacy that is not possible using conventional solutions or methods, and it has been found that users are more likely to act on such scheduling requests because (a) they require prompting, (b) but do not respond well to reminders that are not tied to an actual requirements, and (c) when a request is sent that is closely linked to an actual need (e.g. actual problem or close to an actual mileage level requiring an service visit), they appreciate see this economy in communication as a valuable and considerate service.

In one aspect of the system and method, the server 64 creates a web environment or is linked to a web environment, where vehicle owners can access information related to their vehicle or associated data such as information regarding incentives and other brands associated with these incentives. Within this web environment, the server 64 is operable to track details regarding web searching and navigation to further enhance the information available through the vehicle owner profiles to improve marketing and loyalty programs directed to the vehicle owners.

The present system and method may involve a web environment, or other inter-connected networked environment, wherein an operator of a marketing system can capture browsing and searching activities of a user such as a vehicle owner. The browsing and searching may consist of web-browsing and web-searching activities. Data collected relating to browsing and searching by a user may include click activity, such as the webpages, specific information, or links clicked on by a user. All browsing and searching related activities may be captured by a marketing system, for example an Internet based marketing system. In embodiments of the present system and method the browsing and searching may occur through the use of a variety of communication devices, for example, such as a smart phone, a cell phone, a PDA, a tablet, a laptop, or other types of communication means.

The browsing and searching behaviours of vehicle owners may further be identified as being related to other demographic or other attributes stored for vehicle owners. A combination of vehicle operation data and such other attributes may yield opportunities to tune marketing or loyalty programs. These relationships and other similar relationships may be uncovered by the analytics engine 72.

A skilled reader will recognize the number of ways that searching and browsing facilities may be offered in the marketing program environment and how the browsing and searching information and related activity information may be captured by the marketing program to provide more meaningful services to dealers and manufacturers, when these services are based at least in part on up to date vehicle operation data.

Data collected relating to browsing and searching may further include any copying, tagging, pasting, marking, and/or highlighting of information on a webpage or other page in the environment where the browsing and searching occurs, including any activity whereby information is stored to the vehicle owner profile to enhance that profile and provide further insight to dealers and manufacturers by operation of the system.

In one embodiment of the present system and method all of the information existing in the data centre may be accessible by the analytics engine 72 and data manager 70 for the purpose of generating reports, reviews, lists, results, summaries, overviews, and any other information. The reports, reviews, lists, results, search displays, summaries, overviews, and other information may be generated in accordance with rules of the marketing and loyalty engine 78. For example, rules may be created whereby a marketing and sales report is generated at a regular interval to report on aggregated sales efforts directed to vehicle owners within a specific demographic group and whose vehicle meets specific vehicle operation data criteria such has real time odometer reading.

In other aspects of the present system and method, a search requested by a vehicle owner within the web environment or associated web environment may be moulded based on real time or near real time vehicle operation data to improve relevance or improve revenue realization for a dealer or manufacturer based on the search interaction. For example, if a search is requested regarding a new vehicle by a vehicle owner, the present system and method may dynamically access the owners profile including up to date vehicle operation data, and other information such as location of the vehicle owner, dealership where the last vehicle was bought etc., and use this information as search parameters to display results that are more likely to facilitate a new sale and also trigger other events such as initiation of real time chat with a service or sales representative.

The data manager 70 may also be used to link data to other relevant data that may be accessible to the data manager. For example, the data manager 70 may have access to a historical profile for the particular vehicle owner, including for example the mileage associated with past decisions to buy a new vehicle. This information can be used to send a notification or report to a manufacturer or dealer that may trigger marketing events such as a sales call, sending an invitation to an event, or otherwise.

FIGS. 5a to 5d shows possible implementations of scheduler functions that may be implemented as part of the data manager 70. These show for example a possible mechanism for simultaneous coordination of owner-preferred appointment times and the availability of appropriate shop resources (based on both availability of staff and matched skills sets) at a dealership or other service centre. The methodology and the user interface employed both address the so-called "dilemma of excessive choice", increasing convenience for the vehicle owner (and their overall satisfaction) by actually constraining the available appointment times. It should be understood that numerous other scheduling techniques may be used. The present invention contemplates the use of various techniques for scheduling appointments. The contribution of the present invention is enabling the scheduling based on vehicle operation data, and integrating scheduling into social media interactions where the participation and engagement of users in part is provided based on the social engagement value of the provision of the vehicle operation data as described.

Social Networking Environment

In one particular aspect of the invention, the remote server 64 is linked to or embodies a social networking platform so as to enable a novel and innovative social networking environment that enables social media interactions based on vehicle operation data, or information derived from vehicle operation data. For example, the server application 68 may include a social networking engine 80 that may implement a social networking environment, or may add the features described to an existing third party social networking platform such as FACEBOOK™ for example.

In a particular implementation of the present invention, the social networking engine 80 may be implemented as a Facebook application, that adds the features and functions described herein to the social media interactions enabled by Facebook.

In one particular aspect, of the social network environment of the present invention, the server 64 is operable to generate, based on the vehicle operation data, one or more "vehicle health" reports including "vehicle health" information. A "vehicle health" report may include for example a set of up to data vehicle performance parameters for example up to date mileage, acceleration information, fuel consumption information, performance of sub-systems (such as cooling, steering, climate control and so on). In one aspect of the present invention, the social networking environment enables for example a vehicle owner to interact socially with their own vehicle, and also with the vehicles of others by "following" their vehicle or one or more vehicles of others, by operation of the social networking environment of the present invention.

The social networking platform 80 of the present invention may for example enable the generation of variety of social media interactions that relate to vehicle health, as explained below.

The social networking environment enabled by the present invention provides an innovative mechanism for a number of aspects of social engagement with a vehicle, and between users based on sharing of vehicle operation data. This social engagement is engaging for users in part because of their underlying interest in vehicles. Enabling users to be "social" in regards to vehicles, as described herein, provides useful user engagement, and adds value to a social networking environment that incorporates this functionality. This added value can support revenue models that may be linked to social networking environments generally, including sales of digital goods, advertising, sponsorship revenue and so on.

It should be understood that the present invention, whereby users can engage in social interactions that relate to vehicles, in effect provides significant brand engagement opportunities. This brand engagement can be leveraged using various vehicle brand related promotions, loyalty programs, and so on.

The data manager 70 enables a vehicle owner for example to determine what vehicle operation data, or reports based on vehicle operation data, or related data services, the vehicle owner is willing to share, and with whom, by operation of the social networking environment.

In addition, also as shown in FIG. 1, server 64 and its various resources, leveraging the vehicle operation data, operable to act as a resource to a variety of stakeholders (including manufacturers and dealers for example), enabling a range of novel and innovative services such as maintenance reminders, service scheduling, vehicle health dependent information (such as specific materials or recommendations) being pushed to vehicle owners, reporting to manufacturers to aid in product recall and vehicle marketing and loyalty operations and so on. It is important to note that all of these services benefit from the automated capture of vehicle operation data, by operation of the computer network implemented system described. The conception of such information network or service, and also the mechanism for enabling such an information network or service, represent significant innovations over the prior art. In one aspect of the invention, social media interactions (through Facebook for example) are used to communicate with user using social media. Furthermore, these interactions can provide content that users can then share with their contacts through social media for example FACEBOOK™ or TWITTER™.

For example, User A may follow his/her vehicle through Facebook. A Facebook application delivers feeds, tickers and timelines based on, or based in part on, vehicle operation data. The present invention provides the up to date information to enable User A, who may be the owner of the vehicle that includes a data harvesting device 62, to engage in social media interactions with his/her vehicle, which has never been possible before the present invention. The ability to obtain this real time information that has social media value, motivates User A to subscribe to other information related to his/her vehicle, or the brand of his/her vehicle. This information may relate to promotions, new products, accessories that User A may want to purchase and so on. This provides further content to User A, which s/he may then share with his/her social networks based on his/her preferences. It should be understood that in social networks, users desire new information to share, especially if this information may be of interest to others.

Consumers are generally quite interested in their vehicle, and in the vehicles of others. A vehicle is a significant purchase and an article that consumers usually derive significant pleasure from. It is a competitive industry however and market differentiation is important. Also, generation of additional revenue is also important. More efficient marketing campaigns, especially ones that take advantage of the growing importance of social media in the daily lives of consumers, are required. The system and method of the present invention provides the first compelling social networking environment that addresses vehicles, in a way that is compelling.

A large number of consumers will be motivated to participate in the social networking environment of the present invention. Based on application of conventional social networking functions and features, consumers will organize into social media groups, based on application of social media matching, graph generation and storage (using for example a graph server) and other mechanism. Vehicle fan clubs for example already exist in FACEBOOK™ for example, however, based on the application of the present invention, the level of interest in and engagement with such social networks will increase significantly, as has been observed by the inventors. In addition, the present invention creates an innovative mechanism to leverage such social media groups to create opportunities for brand engagement, in part by providing a technology that enables access to vehicle operation data that is of interest to consumers, and that is provided by manufacturers and/or dealers. While the technology of the present invention may be purchased, installed and used by consumers, if provided by manufacturers and/or dealers, it may constitute a price of admission of sorts to entry to social media groups such as vehicle fan clubs where in exchange for a more compelling method of engagement with the user's vehicle or with other users in connection with their vehicles, which enables manufacturers/dealers to distribution additional information to important user groups (in a social way). This information may include new product information, promotions, contests and so on.

In addition, the social networking engine 80 provides a mechanism to capture and collect for example to the database linked to the server 64 valuable social networking metrics that was previously unavailable regarding for example engagement of users with particular campaigns, information objects, etc. This information may be provided to dealers and/or manufacturers, whether as part of their subscription to the platform, a separate subscription to this access as a data service. Alternatively, dealers and/or manufacturers may access this information in the form of reports generated by the analytics engine 72. It also should be understood that the data manager 70 interoperating with the analytics engine 72 may also enable segmentation of information to provide for example analytics that is segmented based on particular geographic locations, particular vehicle products, specific demographic groups and so on.

The volume of information that is made available for analysis based on the social media interactions enables access to a volume and quality of information that was previously unavailable, or had to be generated based on for example survey information that is notoriously difficult to collect and can often be rather inaccurate because of small sample size. The present invention provides significant opportunities for capturing consumer feedback regarding various topics relevant to product design, service optimization, and other topics, more efficiently than was possible bas on prior art approaches that may have been available to dealers and/or manufacturers.

In one aspect of the invention, the system enables a vehicle to operate as a discrete entity that is capable of speaking for itself within the confines of a social media platform, and enabling interactions and commentary (both positive and negative) among vehicle owners, which is of critical interest to all service providers in the automotive ecosystem. The social networking environment by providing an accessible outline for such interactions and commentary renders these interactions detectable and therefore actionable.

The present invention therefore provides significant advantages to consumers, to dealers, and to manufacturers.

It should be understood that the functions and features of the present invention relate to vehicle information system, as described above, may be integrated with the social networking environment aspects of the present invention. For example, notifications generated by operation of a dealer information system 74, a manufacturer system 76 or a loyalty engine 78 may be delivered via the social networking environment of the present invention. User A's Facebook landing page may link for example to one or more web pages that are within Facebook social network, and may be enabled by the social networking engine 80 (implemented as a Facebook application), in order to provide access for example to vehicle operation data such as a "vehicle health report" delivered in a user interface that is consistent with the overall Facebook user experience. These web pages may provide a dashboard that may be used to access various functions and features associated with User A's vehicle or the brand of the vehicle. For example, these pages may be delivered to users as a vehicle related electronic dashboard, fed by one or more Internet network implemented services.

Figure 4A:
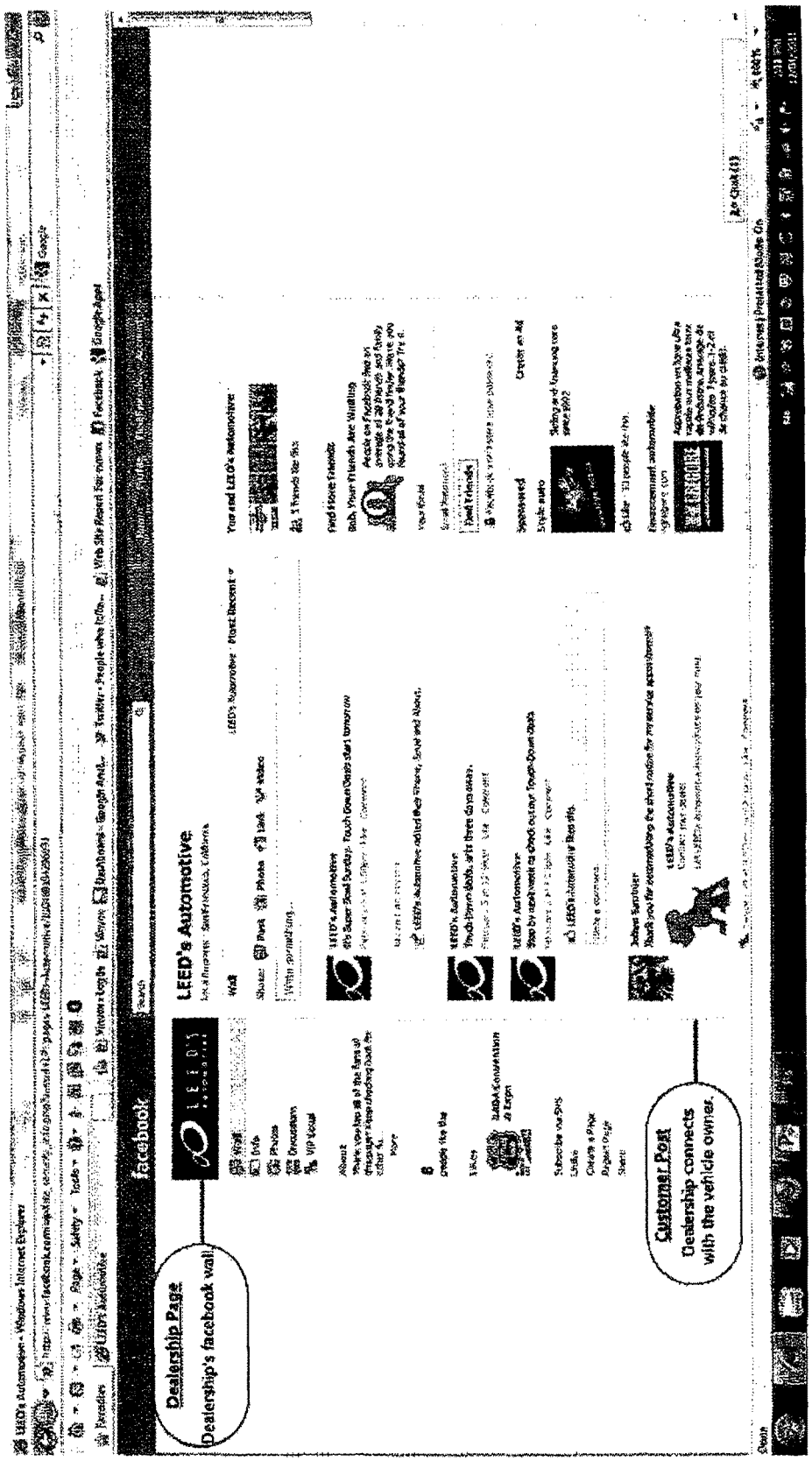
FIGS. 4a, 4b, and 4c illustrates representative user interfaces for accessing functions of the system, integrated with a third party social media platform.

As shown in FIG. 4a, the social networking engine 80 may provide a mechanism to interact with a particular leadership, and access relevant information, including information may be generated or acquired based vehicle operation data that is harvested on a real time or near real time basis.

Figure 4B:
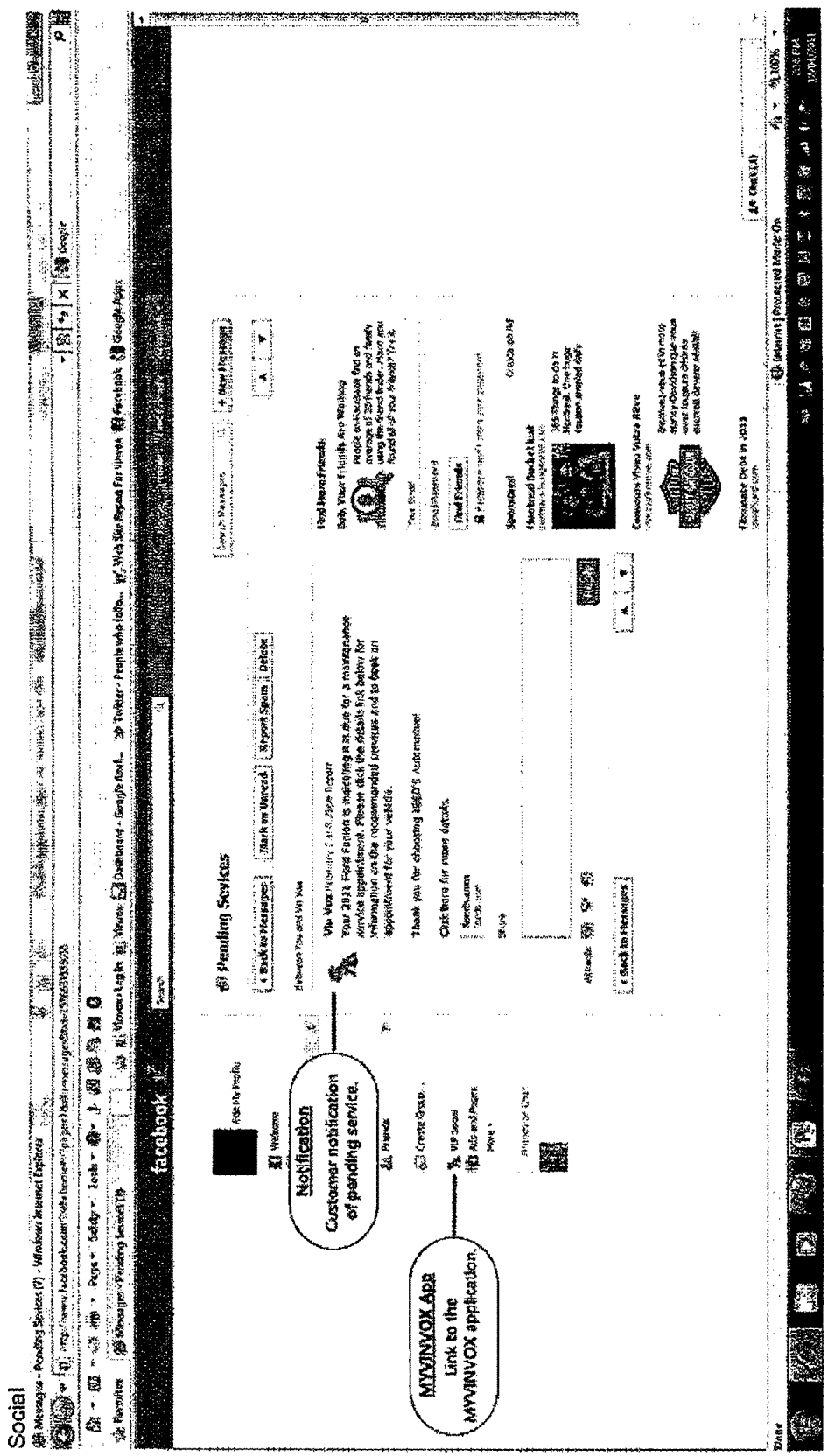

As shown in FIG. 4b shows a representative user interface enabled by the social networking engine 80, in a particular implementation of the present invention. A mechanism is shown whereby User A may "follow" his/her vehicle and receive notifications based on current vehicle operation data including for example a request for scheduling of a service visit. The social media interaction automatically involves in this case User A's dealership, providing a link to User A to schedule a service appointment with the dealer.

Figure 4C:
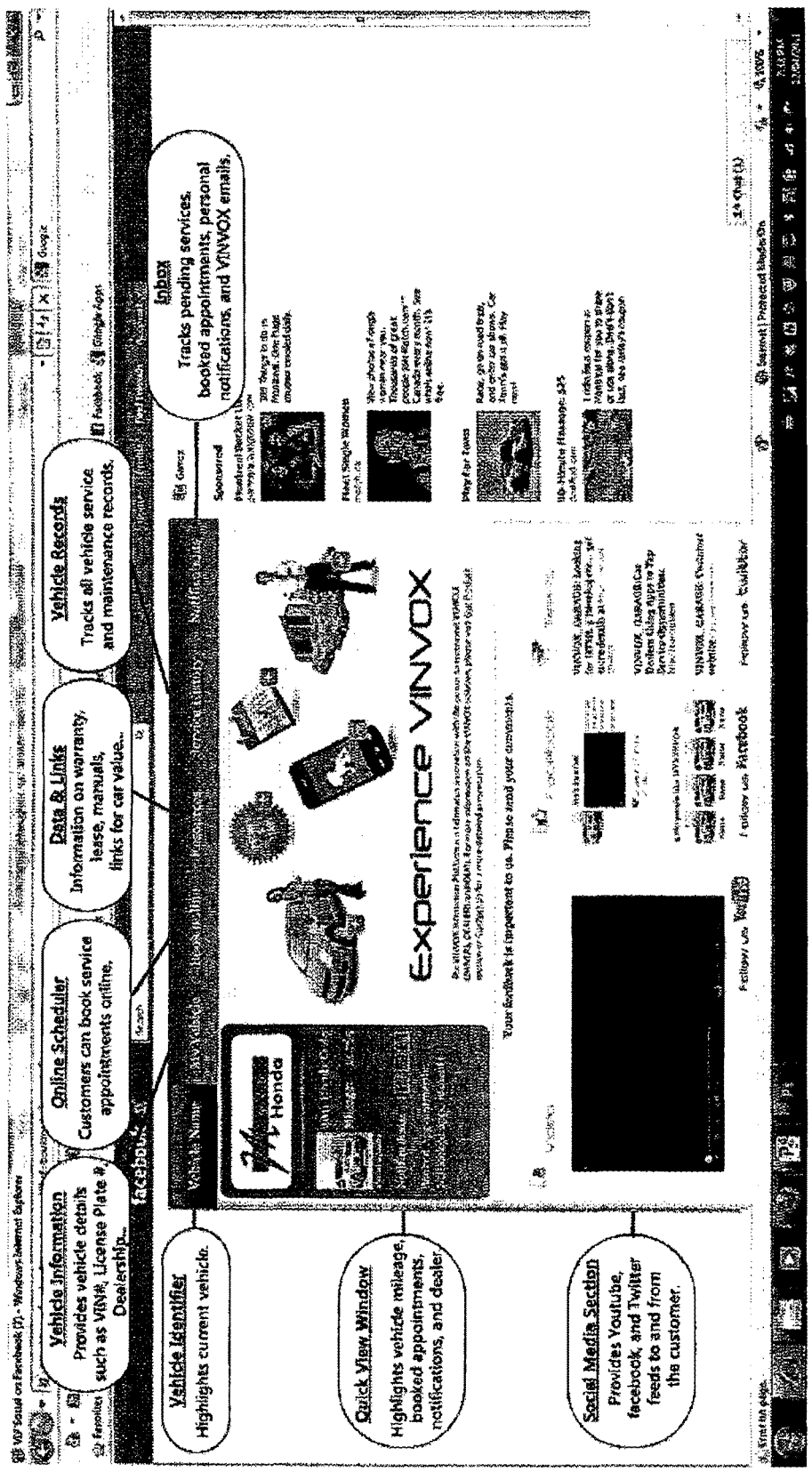
Figure 5A:
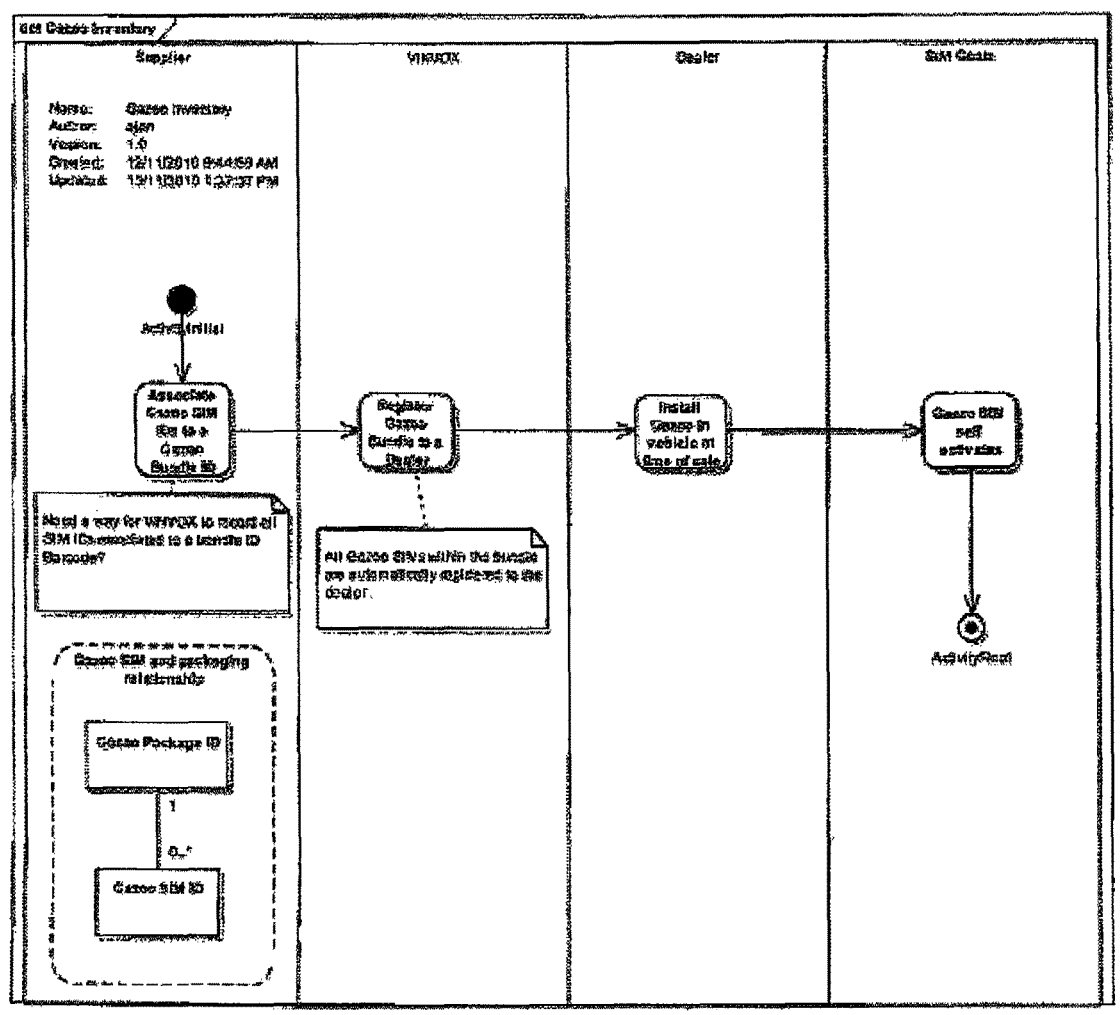
FIGS. 5a, 5b, 5c, and 5d illustrate workflows for enabling service call scheduling based on vehicle operation data provisioned by operation of the present invention.
Figure 5B:
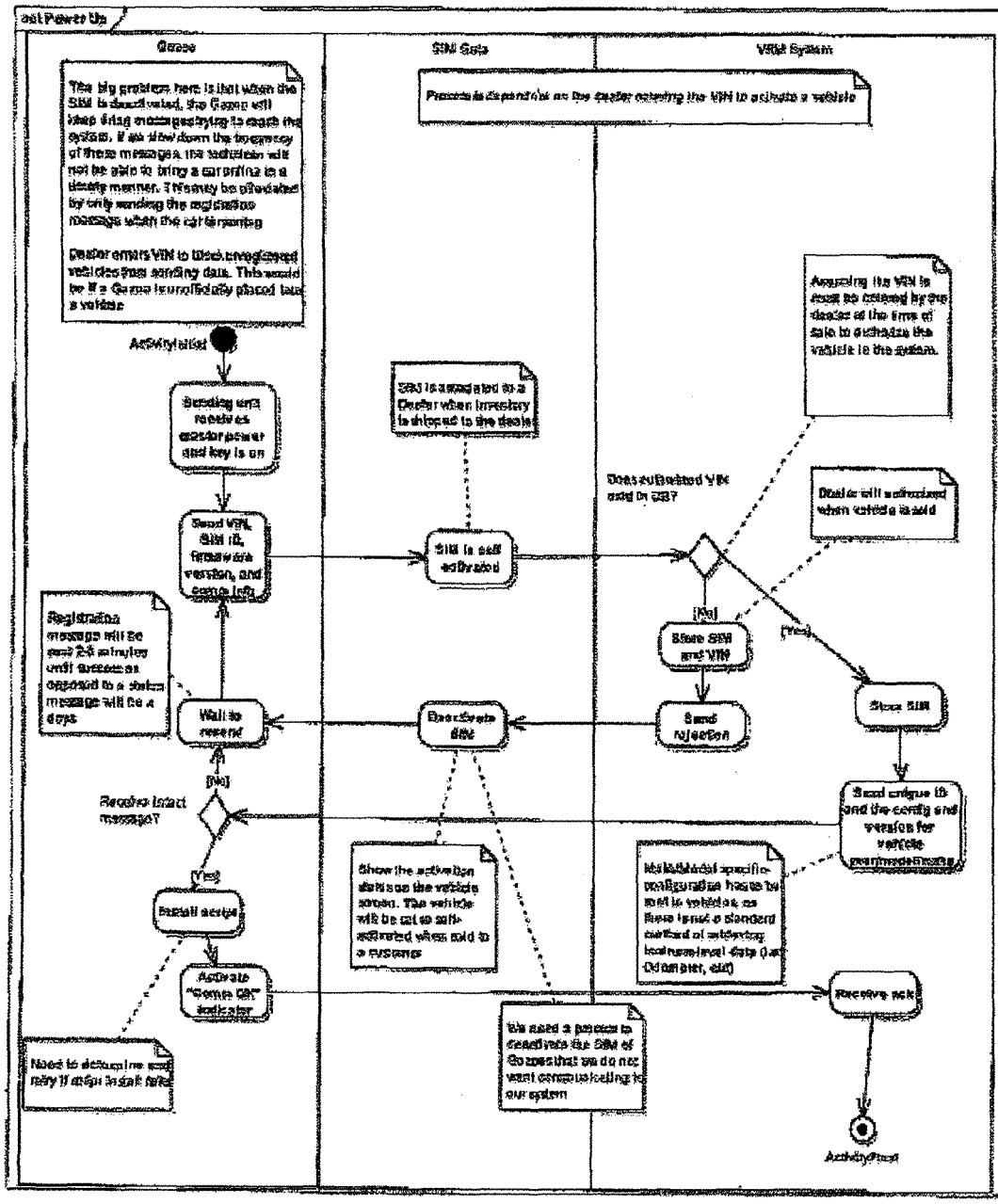
Figure 5C:
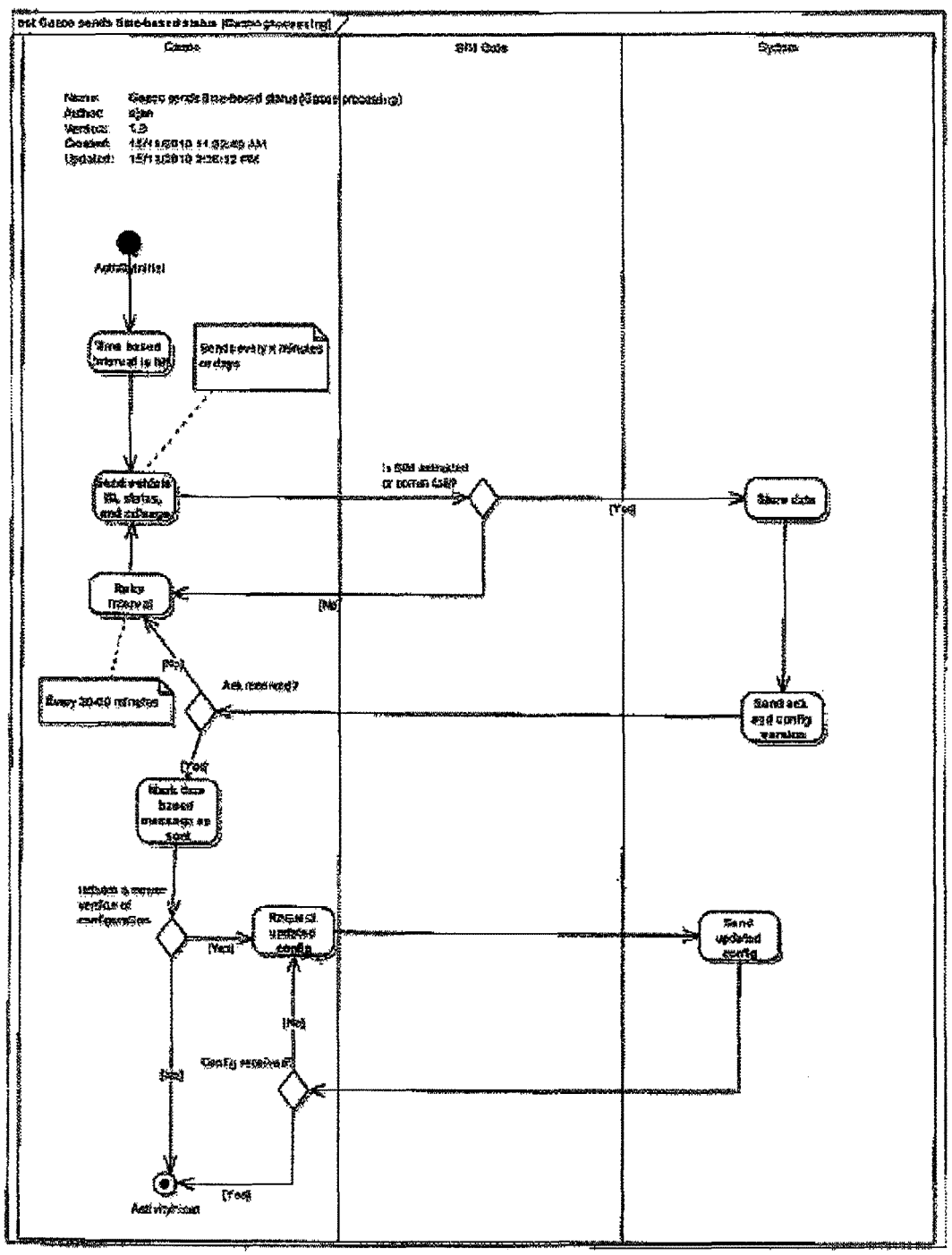
Figure 5D:
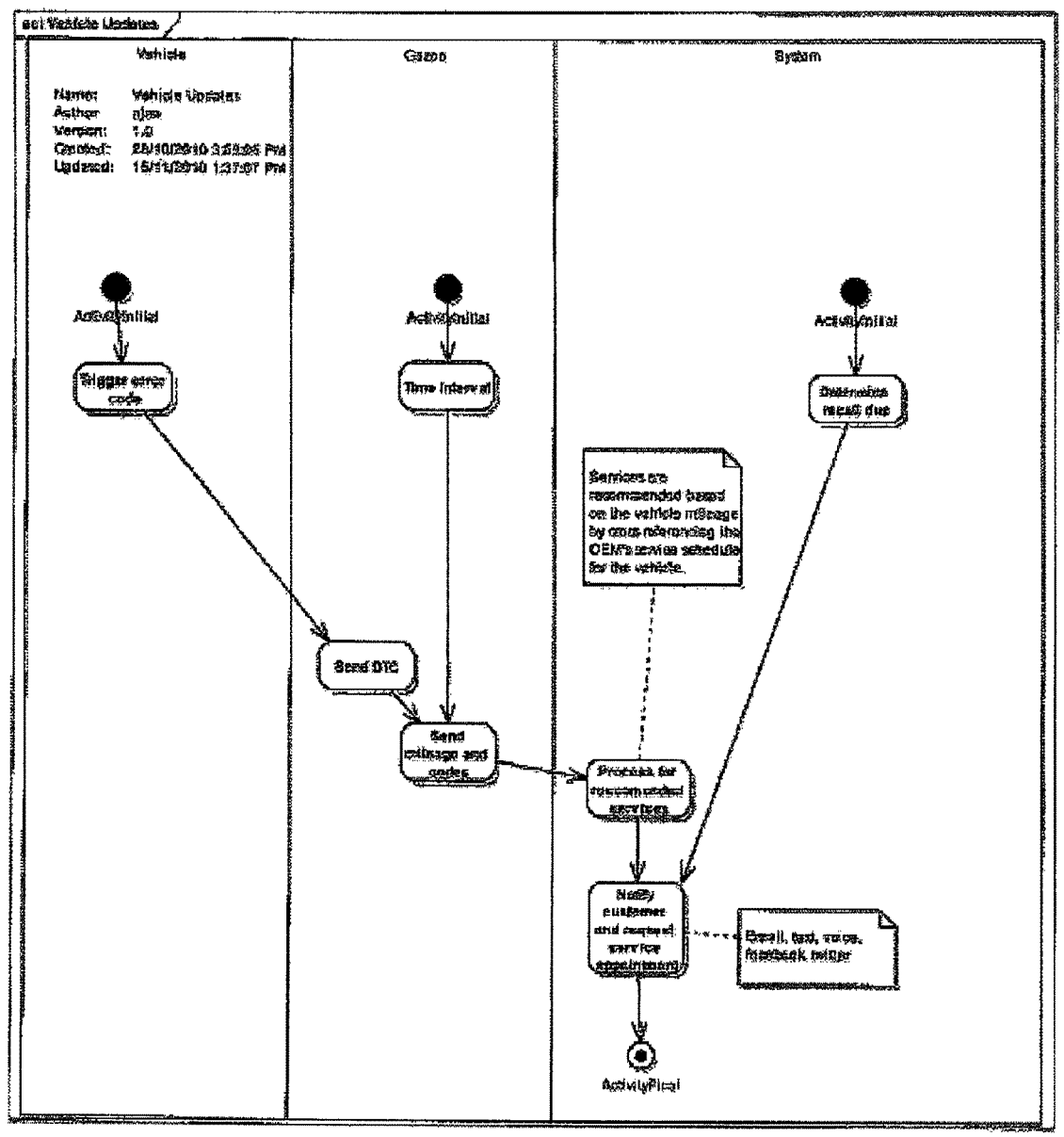

FIG. 4c shows another example of a possible implementation of the social networking engine 80. In this case the implementation of an overall dashboard of vehicle related information and services is illustrated, some of which may be provisioned based on access to vehicle operation data. The screen shown in FIG. 4c may be understood as a personalized (VIN- and driver-specific) information portal that links to individual information services that would be provided. Additional services would typically be layered upon the base services shown. Those additional, personalized information services would be derived from data collected by the on-board harvesting device, or implemented as a "mashup" of directly harvested data and other external data consumed as a web service from other industry sites.

A vehicle 60 provisioned with the resources described herein can communicate with the outside world and has a unique opportunity to interact with other human and non-human entities. Such a vehicle has an unprecedented ability to express itself in terms of its own overall health, location, direction of travel, proximity to other key entities of interest, interpretation of ambient traffic levels, and many other directly and indirectly measurable data points. The vehicle can therefore legitimately exist an entity on any social media platform, and has useful things to communicate about itself and its real-time environment to its owner, owners of comparable vehicles, the dealer or service provider, the manufacturer (as an interested "parent"), and even other vehicles equipped with compatible technology. The present invention therefore blurs the distinction between human-to-human (h2h), human-to-machine (h2m), and machine-to-machine (m2m) interaction on any given social media platform. As vehicles become more intelligent (i.e. capable of monitoring and controlling more operating parameters), communication enablers such as the data harvesting device 62 described herein will inevitably make the conversation with other vehicles and humans richer and more valuable in any social media environment.

It should be understood that the data manager 70 may be used to manage various information flows that are dependent in part on vehicle operation data, including for example:

Posting key vehicle operating parameters (such as engine performance parameters), or actual spacing between maintenance intervals (etc.), to vehicle-specific home pages on multiple social media sites.

Aggregating and interpreting vehicle operation data and dispatching relevant communications to other "vehicle entities" within the social media environment. For example, a high rate of incidence (among suitably equipped vehicles) of a particular fault and occurring within a narrow band of mileage intervals could trigger an advisory posted on social media platforms and targeting comparable vehicles and their owners. This would then prompt specific pre-emptive checks and potential replacement of failing components in advance of an actual fault occurring.

Deliver personalized messaging from service providers to potential customers, of an informational nature and in direct reference to the reported health and operational state of the vehicle.

In another particular aspect of the implementation of the social networking aspects of the present invention, a particular feature of the system of the present invention provides a mechanism for mitigating the serious issue of driver distraction. For many individuals whose lifestyle involves a high degree (or even constant) level of social media connectivity through portals such as FACEBOOK™ and/or TWITTER™, it is common practice for them to access such sites using a mobile device from within vehicle. This has been proven to be more hazardous than conventional cell phone operation while operating a vehicle, which is also being banned in many places. Nonetheless, the practice of accessing social media sites while driving continues to be an issue.

The real time or near real time access to vehicle operation data enabled by the present invention, including through social networks can be further utilized in another representative application of the information architecture provided by the present invention.

Since the solution described herein can:
1. Detect that a vehicle's engine is running and, in fact, whether it is in motion,
2. Can transmit that "active" state instantly to the server 64, via the server 64 for example to third party social networking platforms,
3. The social networking engine 80 may enable for example a cross-referencing of the vehicle VIN to a primary social media account (such information being collected to facilitate maintenance reminders and other targeted consumer communications),
4. Initiate in response a web service interface that may be accessed for example by authorized partners, Therefore,
1. Social media application providers (Facebook, Twitter, etc.) would have the opportunity of blocking access to their sites until the vehicle has been stopped, or parked;
2. Mobile network carries (Verizon, AT&T) would have the opportunity of blocking access to texting features
3. Access to any specific web-based or communication services while a vehicle is in motion could be inhibited, directly addressing the issue of driver distraction and generally improving safety.

Representative Implementation

Data Harvesting Unit or Device

In a particular implementation, the data harvesting unit it best understood as a sensor unit that is configured to gather operational/maintenance information of a vehicle via a data port, process the information and communicate it regularly via wireless communication to a remote server (64).

A number of different data harvesting devices may be used. These may be installed as an after market installation, or vehicles may be designed that incorporate a data harvesting unit.

The data harvesting unit generally includes: (a) a physical connector for connecting to the data port, (b) a micro-computer, (c) a storage medium, and (d) a wireless communication component, where (a) is connected to (b), and (c) and (d) are connected to (b). The micro-computer is linked to a device computer program that is operable to provide instructions to the micro-computer to define a (A) device registration component, and (B) a data logging and transfer component. The device computer program optionally includes a management component that defines the base parameters of the functioning of the data harvesting unit, and which is operable to receive via the wireless communication components updates to its programming from authorized remote computers thereby enabling the operations associated with the data harvesting unit to be remotely updated over time.

The registration component is operable to register the data harvesting unit with one or more remote computers (such as the server described below). The data logging component is operable to acquire vehicle operation data, in part by accessing data from the data port, and also processing the data as explained below, in order to create vehicle operation data which may constitute enhanced data relative to the data available from the data port. Vehicle operation data may be stored to the storage medium, to enable wireless communication of the vehicle operation data via the wireless communication component on an intermittent basis as further explained below.

It should be understood that the data logging and transfer component includes data extraction functionality. There are a number of aspects of useful vehicle operation data that be obtained directly from data obtained from the data port, for example, an OBD-II port, and there is a need to extract this data by embodying extraction operations into the data harvesting utility. In one particular aspect, configuration data is provided to the device, or embodied in the device, that enables the data harvesting unit to obtain specific data such as real time odometer values from the data stream accessible through the OBD port. For example, as is evident from the device specifications explained below, the device is operable to analyze raw data from the OBD-II port and based on the arbitration ID (which operates as a header) for a particular data set, establish what rules to apply in order to query the OBD-II port, or process data sets from the OBD-II port to obtain from the string the desired data such as odometer information. The querying strategy/extraction logic is embodied in the operations of the data harvesting device as further explained below. The operator of the system has access to a library that includes processing rules for processing OBD data based on standardized published codes, as well as rules for processing non-OBD data which may be dependent on the model and make of the vehicle and which is compiled through direct analysis of such vehicles. This library is used to establish configuration data for the data harvesting unit, particular for the model and make of the vehicle to which the device is installed. Either the model and make is known prior to configuration of a device for a particular vehicle, or this information is obtained or extrapolated from the VIN information, and then accessed from the storage medium or by communication with the remote server(s). It should also be understood that through the configuration data, the data harvesting utility is operable to obtain the desired information with an optimal number of commands.

The parsing and interpretation of the codes into usable information is performed within the data harvesting device using a pre-loaded or remotely-loaded map, or raw coded results from the vehicle's data bus are transmitted to a server computer and interpreted upon receipt.

Accordingly, the data logging and transfer component is operable to obtain and transfer real time or near real time vehicle operation data such as, significantly, odometer information rather than approximate odometer information which is what prior art systems rely on. The access to accurate odometer information in particular, and other aspects of vehicle operation data besides, feeds a number of valuable systems and processes described below including enhanced scheduling, vehicle related marketing and loyalty programs, and social networking environments that use aspects of vehicle operation data.

Another aspect of the data logging and transfer component is that it can be configured to incorporate instructions for managing wireless communication of data between the various data harvesting devices and the remote servers(s) in an effective manner. For example, the device can be configured, using the data logging and transfer component, to dynamically connect to selected networks as they become available, and in particular to utilize lower cost connections if they are available. In other words, the data logging and transfer component may incorporate a network selector that incorporates state of the art technology in this domain, triggering, for example, the transfer of vehicle operation data to the remote server(s) during times when low cost networks are available; increasing the frequency of transfers when lower cost networks are available; decreasing the frequency of transfers when only higher cost networks are available; varying the frequency of transfer based on cost versus ranking of logged data based on pre-determined importance or relevance criteria, and so on.

It should be understood that in an alternative embodiment, the logic and operations defined by the device computer program may be hardwired to the device.

It should be understood that the data harvesting features of the present invention as described above may be further enhanced by combining the vehicle operation data with other techniques for determining user interest for example by logging web interactions in real time or near real time, in accordance with related methods known in the art.

In one embodiment of the present system and method, the server 64 creates a web environment or is linked to a web environment, where vehicle owners can access information related to their vehicle or associated data such as information regarding incentives and other brands associated with these incentives. Within this web environment, the server 64 is operable to track details regarding web searching and navigation to further enhance the information available through the vehicle owner profiles to improve marketing and loyalty programs directed to the vehicle owners.

The present system and method may involve a web environment, or other inter-connected networked environment, wherein an operator of the marketing system can capture browsing and searching activities of a user such as a vehicle owner. The browsing and searching may be web-browsing and web-searching activities. Data collected relating to browsing and searching by a user may include click activity, such as the webpages, specific information, or links clicked on by a user.

All browsing and searching related activities may be captured by the marketing system. In embodiments of the present system and method the browsing and searching may occur through the use of a variety of communication devices, for example, such as a smart phone, a cell phone, a PDA, a tablet, a laptop, or other types of communication means.

The browsing and searching behaviours of vehicle owners may further be identified as being related to other demographic or other attributes stored for vehicle owners. A combination of vehicle operation data and such other attributes may yield opportunities to tune marketing or loyalty programs.

A skilled reader will recognize the number of ways that searching and browsing facilities may be offered in the marketing program environment and how the browsing and searching information and related activity information may be captured by the marketing program to provide more meaningful services to dealers and manufacturers.

Data collected relating to browsing and searching may further include any copying, tagging, pasting, marking, and/or highlighting of information on a webpage or other page in the environment where the browsing and searching occurs, including any activity whereby information is stored to the vehicle owner profile to enhance that profile and provide further insight to dealers and manufacturers by operation of the system.

In one embodiment of the present system and method all of the information existing in the data centre may be accessible by the analytics engine 72 and data manager 70 for the purpose of generating reports, reviews, lists, results, summaries, overviews, and any other information. The reports, reviews, lists, results, search displays, summaries, overviews, and other information may be generated in accordance with rules of the marketing and loyalty engine 78. For example, rules may be created whereby a marketing and sales report is generated at a regular interval to report on aggregated sales efforts directed to vehicle owners within a specific demographic group and whose vehicle meets specific vehicle operation data criteria such has real time odometer reading.

In other embodiments of the present system and method, a search requested by a vehicle owner within the web environment or associated web environment may be moulded based on real time or near real time vehicle operation data to improve relevance or improve revenue realization for a dealer or manufacturer based on the search interaction. For example, if a search is requested regarding a new vehicle by a vehicle owner, the present system and method may dynamically access the owners profile including up to date vehicle operation data, and other information such as location of the vehicle owner, dealership where the last vehicle was bought etc., and use this information as search parameters to display results that are more likely to facilitate a new sale and also trigger other events such as initiation of real time chat with a service or sales representative.

Remote Server(s)

The overall system includes one or more data harvesting devices, and one or more remote servers that interoperate with the data harvesting devices, is illustrated in one particular implementation in FIG. 1.

The various data harvesting devices 62 that log and transfer the vehicle operation data for the vehicles 60 are configured to communicate with one or more remote servers 64.

The administrative utility of the server application 68, mentioned earlier, may ensure that:

Manufacturers only access data for their vehicles, or their dealers, as is pre-determined.

Dealers access only data for which they are authorized such as vehicle operation data for vehicles sold by them, or for vehicle owners that have agreed to their vehicle operation data.

Vehicle owners only access data for their vehicles, or data for other vehicles based on consent from the other vehicle owners.

Trend data based on underlying aggregated vehicle operation data based on permissions or payment of fees such as subscription fees.

Derivative data such as enhanced data using analytics or reports may only be made accessible to subscribers for such information.

Various other access conditions are contemplated, whether to comply with permissions, user preferences, privacy laws or otherwise, or to address additional functionality described below.

The various functions and data linked to the server 64 may be made available to users, based on access established using the administration utility, via a web interface presented by the server 64, which provides access to a series of web pages that enable navigation functions and presentment of accessible data.

In one particular implementation, the operator of the server 64 is provided an Access Point Name (APN) by one or more wireless carriers, which acts as a unique identifier on the applicable wireless network, and enables the various communications from the data harvesting devices to be received by the server 64, the various devices using the APN only, and for billing for data services to be integrated with other billing functions that may be associated with the server 64.

In one particular implementation of the invention, the various data harvesting devices 62 are operable to assemble a message that includes the VIN, and one or more vehicle operation data parameters, and send the message on a wireless basis to the server 64. It should be understood that in one aspect, the data harvesting devices 62 are designed such that they are able only to push information and therefore are not vulnerable to security attacks. This limits the ability to remotely modify their programming but in this case updates can be distributed differently, for example, providing additional configuration data via a suitable data port. In situations requiring initiation of transactions from a remote location, or remote re-programming of the device firmware, or otherwise involving the transmission of potentially sensitive information such as GPS coordinates, the device is capable of and will implement a standard symmetric-key encryption algorithm such as DES or AES. The use of the VIN number in the communications also protects the privacy of the vehicle owners as any third party intercepting the communications is unlikely to have access to this information and therefore a connection between the message and activities of a person cannot be made. In addition, the VIN is only used as the primary identifier during initial configuration of the data harvesting device, during which time a unique and random device ID is assigned by a remote application server. Subsequent communications use this random ID which is only associated with a vehicle within the system database and is not otherwise discoverable.

The server 64 is operable to retrieve the VIN from the messages and look up the VIN from a library in the data centre to identify the associated profile and data section in the data centre. The associated profile determines the rules for processing and providing access to the vehicle operation data in the message or aggregated vehicle operation data across multiple messages.

At the very least, leveraging the data manager 70, the server 64 acts as an information gateway or router, routing information based on stakeholder defined rules (subject to permissions) by sending vehicle operation data in the desired form to the desired locations, whether this is to remote computers and/or applications associated with these computers controlled by manufacturers, dealers, or vehicle owners.

The present system may enable specific features, for example, surveys, incentive communications, data mining and other features, including leveraging the analytics engine 72.

Cloud Architecture

To effectively scale and provide a cost effective solution, the server 64, in one implementation, may be divided into two main systems: a master server application for full data aggregation, and a second division housing logical server applications for each tenant. A tenant, in one implementation of the present invention, may be defined as a a dealership, but the solution does not preclude other "vehicle owning" entities from being a tenant.

This architecture allows the system to offer complex functionality to each tenant in a cost efficient manner that would otherwise require numerous, costly, application components and would be generally unmaintainable.

Multi-Tenancy

Multi-tenancy requires a more complex solution as data is maintained for multiple tenants in the same system, but data hiding principles are preferably implemented carefully.

Vehicle Data Processing

The vehicle data processor is the logical assembly of application components used in the communication to the data harvesting devices 62 through a secure and reliable protocol through to the decoding of vehicle GAN and OBD data; all as a means to feed the back-end business functions operating on the decoded data.

In one implementation, the messages are sent from each data harvesting device 62 to a data harvester server component that is part of the server application 68 and that communicates using a common protocol relative to the data harvesting devices 62. The data harvester server component, in one implementation, shuttles the collected data to the enterprise service bus where it is available for processing by other applications.

The data messages on the service bus may be decoded using custom parsing scripts specific to the make and model of the vehicles involved and the resulting parsed data is again made available on the ESB but in a format that now has business domain context. These contextual events may include but are not limited to diagnostic trouble code (DTC) information, odometer readings, or other CANbus formatted data.

The mileage and Diagnostic Trouble Code information can be used to generate notifications to the vehicle customer relaying that service is required.

Figure 6A:
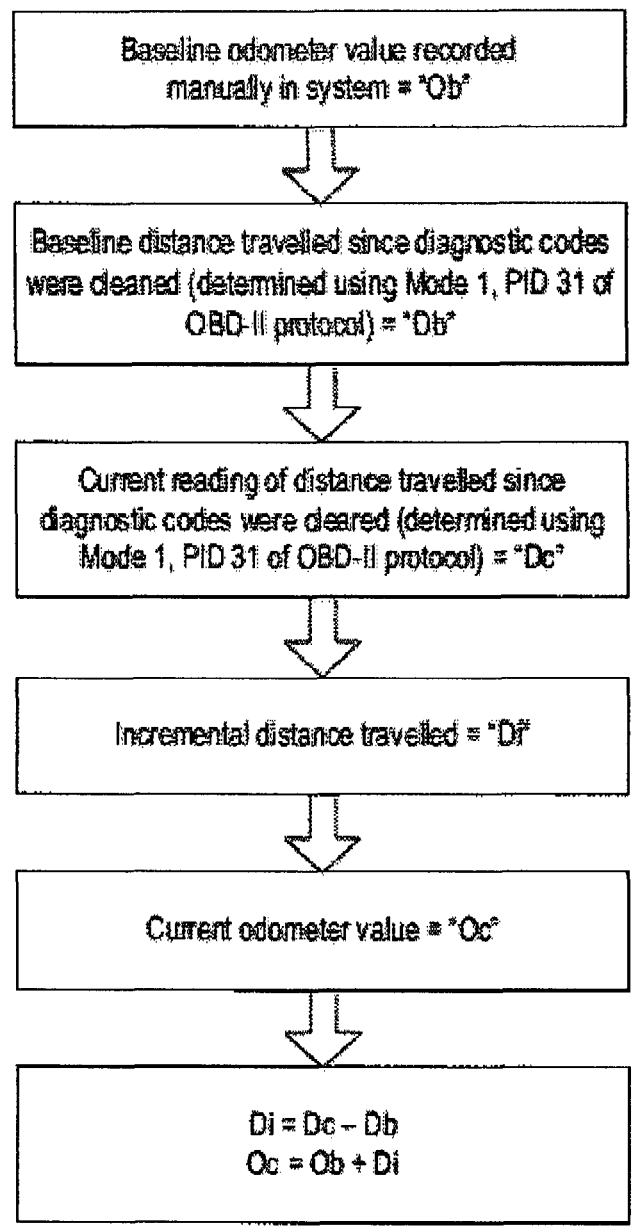
FIGS. 6a and 6b illustrate representative data harvesting processes in accordance with the present invention for enabling the processing of vehicle information so as to generate vehicle operation data.
Figure 6B:
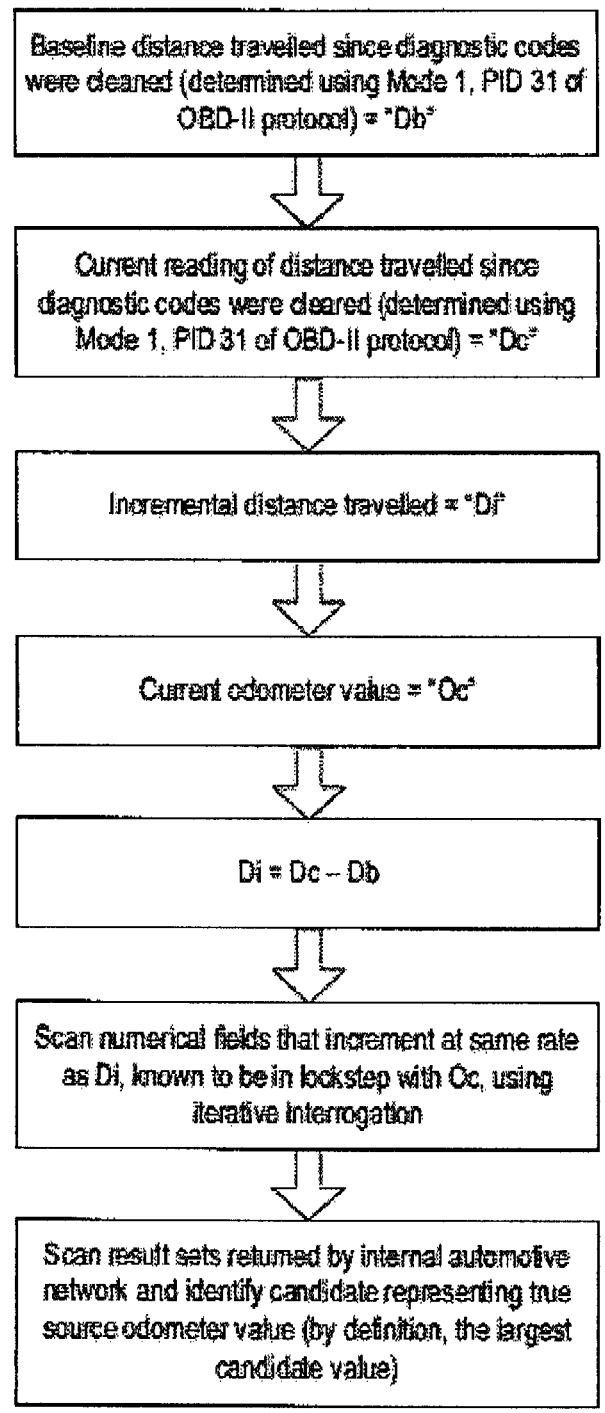

FIGS. 6a and 6b illustrate to possible methods for processing vehicle information to generate vehicle operation data.

Data Integration and Interfaces

This portion discusses certain data integration and data interface aspect of the present invention.

1. DMS Integration

Dealership Management System integration falls generally into two categories: non-hostile, using vendor approved APIs; and hostile integration wherein backdoor access to the system is used to gain access to data. Hostile integration is generally done with a peer computer on the same network as the DMS, usually located within the dealership itself. DMS vendors have been moving in the direction of offering access to dealership systems through the use of web service APIs and other standardized mechanisms, all fully supported by the solution as depicted in FIG. 1.

2. Recall Information

In the United States, the National Highway Traffic Safety Administration (NHTSA) and in Canada, Transport Canada, host a database of manufacturer recalls on all motor vehicles. The server application 68 may be configured to access and import the latest recall information and notify customers through messaging channels described herein regarding recalls that are pertinent to the make and models that they own.

3. Messaging Systems

The server application 68 may include or linked to a messaging component that enables event drive communications with customers and dealership personnel through multiple channels. These channels may include email, text messaging (SMS), smart phone message icons, Blackberry messenger, Twitter feeds, Facebook wall posts and messages, other social media messaging channels, and interactive voice response (IVR).

4. Business Rules

The server application 68 may also incorporate a rules engine or rules builder to enable the assembly of business rules that may embody complex calculations including for enabling change to business processes. The rules engine facilitates matching of vehicle maintenance profiles against previous services completed, proximity to maintenance thresholds based on actual odometer value, as well as vehicle model specific and operating environment specific facts. The rules engine also facilitates the calculation of a "health" score using various maintenance, warranty, lease terms, environmental facts but does not exclude other inputs.

5. Event Stream Processor

The server application 68 may also incorporate or link to an event stream processor/complex event processor that acts as a conduit for vehicle and system generated events and allows for temporal analysis and correlation of events and external data sources. This allows the creation of new events based on the occurrence of or non-occurrence of other events.

6. Device Management

The server application 68 may include functionality for delivering and enforcing updates to the programming of the various data harvesting devices 62. The server application 68 may incorporate various other techniques related to managing the plurality of data harvesting devices 62 to enable the management of the various components to provide an integration information network.

7. Enterprise Service Bus

In one implementation of the invention, the server application 68 includes or is linked to an service bus which may be responsible for the proxying, routing and mediation of all messages travelling throughout the server application. It allows for layering security, authentication, authorization, and censorship of data through the use of policies. The enterprise service bus also allows for message redirection based on content, transformation of data into other formats.

Social Networking Platform

As mentioned earlier, one aspect of the invention is an innovative social networking environment, enabled by a novel and innovative social networking platform, as described. The social networking platform may be implemented in a number of ways as described above, including as a Facebook application for example that applies a custom configuration of the Facebook platform, wherein one or more operations based on vehicle operat data are enabled.

It should also be understood that the features described may be integrated into an existing social networking platform, and also may be implemented as a proprietary social networking platform.

The social networking platform may include a series of utilities designed to enable enterprise engagement within a social networking environment, or in connection with a social networking environment.

The social networking platform may be implemented using one or more application servers. The system of the present invention, in one aspect thereof, may include in order to enable the social networking environment of the present invention an application server and one or more graph servers. The system is generally connected to a network of interconnected computers. The database shown in FIG. 1 may include for the purposes of the present invention a ember database, a relationship database, and a search database. The application server may also contain a matching engine to enable the suggestion of friend combination based on a series of criteria. Friend suggestions may require acceptance, after which they are added to relevant social graphs managed using the graph server. The matching engine may include various functions or features for matching individuals based on a variety of criteria including for example demographic attributes, personality traits, and also factors related to the enterprise objectives. For example the matching engine may be used to match friends within groups defined by the social networking environment based on similarity (for example similarity of vehicle related interests and so on).

The application server may include a web presentment utility. The web presentment utility may be a standard utility or set of utilities operable to present one or more web pages based on the workflow or social interactions described herein.

References herein to devices, for example, such as mobile or portable devices, that may be mobile or portable communication devices, may include many types of devices such as any of the following: cell phones, smart phones, PDAs, digital music players, GPS devices, e-book readers, portable gaming devices, digital cameras, tablets, netbooks, laptops, and any other devices that may be mobile or portable.

Further Details of Implementation

The present systems and related computer programs should not be considered to be limited to a particular type of computer system or computer program implementation. For example, the present systems and methods may be implemented using a distributed and networked computing environment comprising at least one computing device.

Figure 7:
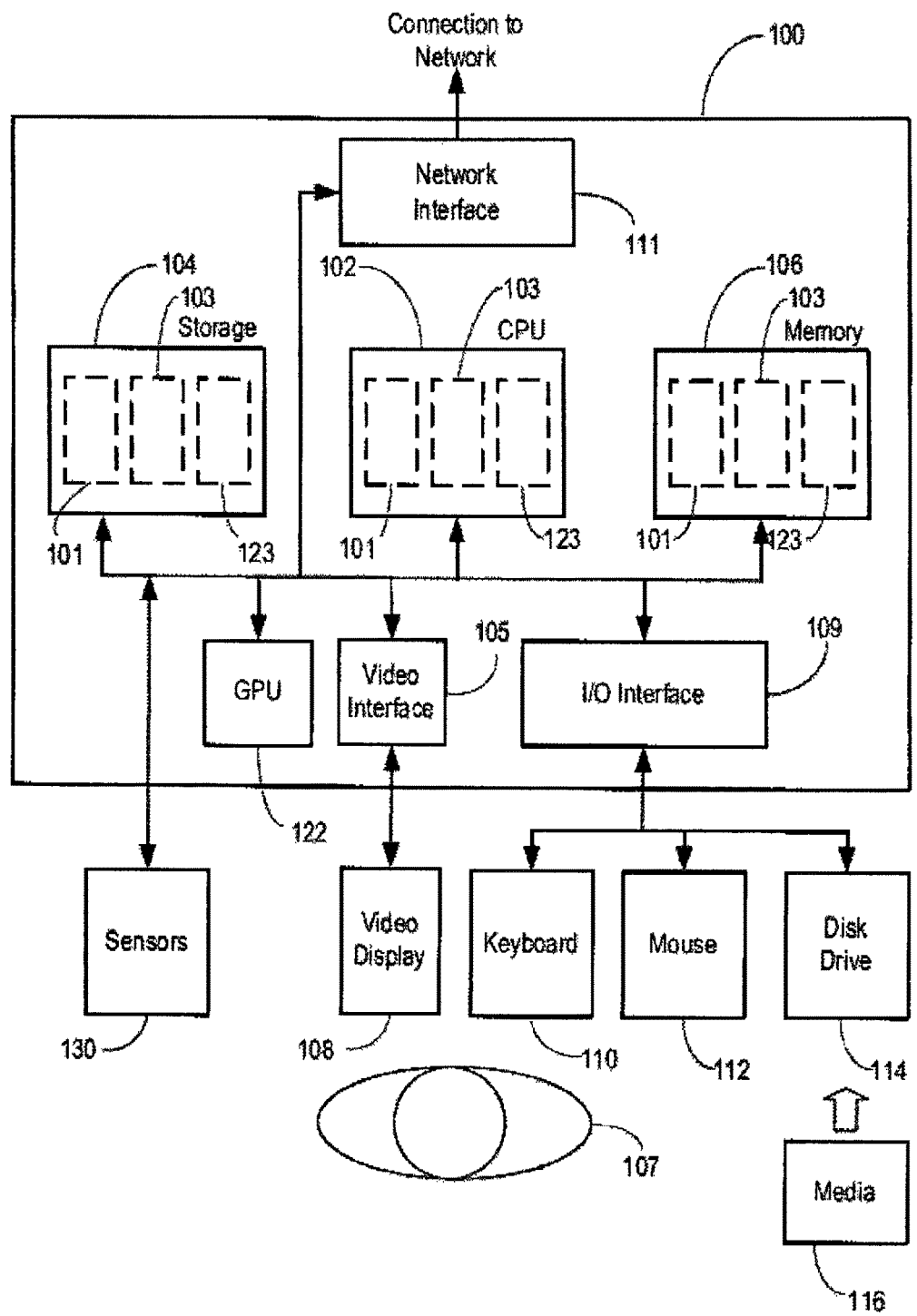
FIG. 7 is a schematic diagram of an illustrative general purpose computing device.

The present systems and methods may involve an Internet, intranet or other networked environment. Therefore, any reference to any of Internet, intranet or other networked environment should be understood broadly to encompass not only the referenced term, but all of Internet, intranet or other networked environment. In the same manner terms indicating aspects of either the Internet, an intranet or another networked environment, such as a webpage in an Internet environment, should be understood broadly to include the equivalent available in the Internet, intranet or other networked environment The present systems, methods and related computer programs may be utilized/practiced in various embodiments. The server 64 in particular may be implemented using a suitably configured computer device, and associated communications networks, devices, software and firmware may provide a platform for enabling one or more embodiments as described above. By way of example, as shown in FIG. 7, a generic computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 110, mouse 112, and disk drive or solid state drive 114 connected by an I/O interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate with other suitably configured data processing systems (not shown). One or more different types of sensors 130 may be used to receive input from various sources.

The present systems and methods may also be practiced on virtually any manner of computer device including a desktop computer, laptop computer, tablet computer, customized ECU, etc. provided that optimal processing, memory and other hardware/software requirements are met. The present systems and methods may also be implemented as a computer-readable/useable medium that includes computer program code to enable one or more computer devices to implement each of the various process steps in a method in accordance with the present system and method. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

The invention claimed is:

1. A system for enabling the generation and sharing of vehicle operation data via a computer network, characterized in that the system comprises:

(a) a data harvesting device configured for interoperation between a plurality of models and makes of vehicles connected to an information system of a vehicle to obtain on-board diagnostic information consisting of one or more data sets, the data harvesting device capturing vehicle information from the vehicle and processing the vehicle information to generate current vehicle operation data while the vehicle is running, the data harvesting device configured to process the on-board diagnostic information in accordance with a data map specific for a model and make of the vehicle to determine real-time odometer information, the data map selected based on a querying of one or more arbitration identifier headers corresponding to a single one of the one or more data sets; and (b) a computer system in communication with the data harvesting device, the computer system including one or more server computers connected to a computer network;

the computer system including a database system for receiving the current vehicle operation data from the data harvesting device and logging the current vehicle operation data in the database system, the database system including a profile for the vehicle configured to store the received current vehicle operation data; and the computer system being configured to transmit the current vehicle operation data from the profile to the one or more remote server computers in the computer system, wherein the computer system is configured to:

(a) assess the current vehicle operation data as stored in the profile for the vehicle by continuously monitorial the determined real-time odometer information;

(b) determine whether, based on the assessed current vehicle operation data, a service appointment for the vehicle is needed;

(c) if and when a service appointment is determined to be needed, trigger an electronic request for scheduling of a service appointment in real-time or near real-time; and (d) transmit the electronic request to one or more communication devices associated with a user of the vehicle as registered in the profile for the vehicle.

2. The system of claim 1, wherein the current vehicle operation data further includes one or more of (a) current engine performance information, (b) current fuel consumption information, and (c) current performance of vehicle sub-systems including engine emission systems, climate systems, or electrical systems.

3. The system of claim 1, wherein:

(a) the data harvesting device is configured to include or obtain information elements for identifying the vehicle to the computer system, and the data harvesting device includes these information elements in communications from the data harvesting device to the computer system including the vehicle operation data; and (b) the computer system is responsive to the information elements to link current vehicle operation data with the profile in the database system for the vehicle, and to log vehicle operation data to this profile.

4. The system of claim 3, wherein the information elements include the vehicle information number for the vehicle, or the computer system is configured to retrieve the vehicle information number for the vehicle from the database system based on the information elements.

5. The system of claim 1, wherein the current vehicle operation data includes current odometer information and the computer system includes or is linked to a vehicle service appointment scheduling component that is operable to:

(a) access or generate a vehicle information number for the vehicle associated with the vehicle operation data;

(b) apply one or more business rules to determine whether, based on the current odometer information, there is a current service or recall requirement for the vehicle; and (c) generate a request for scheduling of a service or recall appointment, and send this request to one or more communication devices associated with the user.

6. The system of claim 5, wherein the scheduling component is further operable to:

(a) retrieve the personnel and/or part requirements associated with the service or recall requirement, and initiate a lookup request for corresponding service personnel and/or part availability;

(b) send the lookup request to relevant computer systems;

(c) receive a response to the lookup request and include availability information in the response in the request for scheduling sent to the user.

7. The system of claim 1, wherein the computer system is linked to a marketing engine, wherein the marketing engine is operable to generate and send electronic promotional material, including offers, coupons, or tokens, to the user based on the current vehicle operation data.

8. The system of claim 1, wherein the computer system enables the sharing of the vehicle operation data and optionally other related vehicle information via one or more social media networks linked to the computer system, based on one or more preferences defined by a user associated with the vehicle, the profile being adapted to be uploaded to a social media network where a discrete social media account separate from one or more user accounts is generated representative of time responsive to changes to the profile the sharing of of the vehicle operation data and optionally other related vehicle information including updating of the discrete account generated representative of the vehicle.

9. The system of claim 8, wherein the computer system enables the user to follow the vehicle via the one or more social media networks.

10. The system of claim 9, wherein the computer system enables the user to permit one or more social media connections to follow the vehicle via one or more social media networks.

11. The system of claim 8, wherein the computer system enables one or more other users to follow the vehicle via one or more social media networks.

12. The system of claim 1, wherein the computer system is configured to track searching or browsing activity data related to vehicle maintenance or repair and temporally proximate to the generation of the one or more notifications; and wherein a marketing system engine is configured to receive the automatically the searching or browsing activity data, and responsive to the searching or browsing activity data, tune an attribute of a marketing or loyalty program.

13. The system of claim 1, wherein the computer system is further configured to:

automatically operate the discrete social media account such that the discrete social media account generates messages responsive to one or more inquiries received on the social media network, the generation of responsive messages based at least on the vehicle operation data that has been harvested on a real or near real-time basis and stored on the profile.

14. A computer-implemented method for enabling the generation and sharing of vehicle operation data via a computer network, characterized in that the method comprises:

(a) configuring a data harvesting device to connect to an information system of a vehicle, the data harvesting device adapted for interoperation between a plurality of models and makes of vehicles;

(b) the data harvesting device capturing vehicle information from the vehicle to obtain on-board diagnostic information consisting of one or more data sets and processing the vehicle information to generate current vehicle operation data while the vehicle is running;

(c) processing the on-board diagnostic information in accordance with a data map specific for a model and make of the vehicle to determine real-time odometer information, the data map selected based on a querying of one or more arbitration identifier headers corresponding to a single one of the one or more data sets;

(d) the data harvesting device sending the current vehicle operation data to a computer system in communication with the data harvesting device, the computer system including one or more server computers connected to the computer network, being linked to or including a database system, and being configured to transmit current vehicle operation data to one or more authorized remote computers via the computer network;

(e) the computer system receiving the current vehicle operation data from the data harvesting device and logging the current vehicle operation data in the database system, the database system including a profile for the vehicle configured to store the received current vehicle operation data; and (f) the computer system transmitting the current vehicle operation data via the computer network to the one or more authorized remote computers;

wherein the computer system is configured to:

(a) assess the current vehicle operation data as stored in the profile for the vehicle by continuously monitoring the determined real-time odometer information;

(b) determine whether, based on the assessed current vehicle operation data, a service appointment for the vehicle is needed;

(c) if and when a service appointment is determined to be needed, trigger an electronic request for scheduling of a service appointment in real-time or near real-time; and (d) transmit the electronic request to one or more communication devices associated with a user of the vehicle as registered in the profile for the vehicle.

15. The method of claim 14, comprising the step of sharing of the vehicle operation data and optionally other related vehicle information via one or more social media networks linked to the computer system, based on one or more preferences defined by a user associated with the vehicle, the profile being adapted to be uploaded to a social media network where a discrete social media account separate from one or more user accounts is generated representative of the vehicle, follow-able by the one or more user accounts and adapted to be updated in real or near-real time responsive to changes to the profile the sharing of the vehicle operationally other related vehicle information including updating of the discrete account generated representative of the vehicle.

16. The method of claim 15, wherein the computer system is configured to enable the user to follow the vehicle via the one or more social media networks.

17. The method of claim 16, wherein the computer system is configured to enable the user to permit one or more social media connections to follow the vehicle via one or more social media networks.

18. The method of claim 15, wherein the computer system is configured to enable one or more other users to follow the vehicle via one or more social media networks.

19. The method of claim 14, wherein the computer system is configured to track searching or browsing activity data related to vehicle maintenance or repair and temporally proximate to the generation of the one or more notifications; and wherein a marketing system engine is configured to receive the automatically the searching or browsing activity data, and responsive to the searching or browsing activity data, tune an attribute of a marketing or loyalty program.

20. The method of claim 14, further comprising:

automatically operating the discrete social media account such that the discrete social media account generates messages responsive to one or more inquiries received on the social media network, the generation of responsive messages based at least on the vehicle operation data that has been harvested on a real or near real-time basis and stored on the profile.

* * * * *

UNITED STATES PATENT AND TRADEMARK OFFICE
CERTIFICATE OF CORRECTION

PATENT NO. : 9,596,287 B2
APPLICATION NO. : 13/984871
DATED : March 14, 2017
INVENTOR(S) : Ihor Bohdan Rybak, Judson Murray and Matthew Pichette It is certified that error appears in the above-identified patent and that said Letters Patent is hereby corrected as shown below:

Column 24, Line 63 Claim 1 paragraph (b) sub-paragraph (a) should read as follows:
(a) assess the current vehicle operation data as stored in the profile for the vehicle by continuously monitoring the determined real-time odometer information;

Signed and Sealed this
Third Day of October, 2017

Joseph Matal
*Performing the Functions and Duties of the*
*Under Secretary of Commerce for Intellectual Property and*
*Director of the United States Patent and Trademark Office*